(12) United States Patent
Liu et al.

(10) Patent No.: US 12,395,431 B2
(45) Date of Patent: Aug. 19, 2025

(54) CONGESTION CONTROL METHOD AND APPARATUS

(71) Applicant: HUAWEI TECHNOLOGIES CO., LTD., Guangdong (CN)

(72) Inventors: Heyang Liu, Nanjing (CN); Hewen Zheng, Nanjing (CN); Lei Han, Nanjing (CN); Jinfeng Yan, Nanjing (CN); Binghui Wu, Moscow (RU); Huafeng Wen, Nanjing (CN); Peiying Tao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 491 days.

(21) Appl. No.: 17/870,700

(22) Filed: Jul. 21, 2022

(65) Prior Publication Data

US 2022/0368633 A1  Nov. 17, 2022

Related U.S. Application Data

(63) Continuation of application No. PCT/CN2021/071251, filed on Jan. 12, 2021.

(30) Foreign Application Priority Data

Jan. 23, 2020  (CN) .......................... 202010077053.9

(51) Int. Cl.
*H04L 47/11* (2022.01)
*H04L 43/106* (2022.01)
(Continued)

(52) U.S. Cl.
CPC .......... *H04L 47/115* (2013.01); *H04L 43/106* (2013.01); *H04L 47/10* (2013.01); *H04L 47/122* (2013.01)

(58) Field of Classification Search
CPC ..... H04L 43/106; H04L 47/10; H04L 47/115; H04L 47/122; H04L 47/28; H04L 47/29; H04L 47/35

See application file for complete search history.

(56) References Cited

U.S. PATENT DOCUMENTS 5,367,523 A  *  11/1994  Chang ..................... H04L 47/10
                                                   370/235
5,432,798 A  *  7/1995  Blair ..................... H04L 1/1685
                                                   714/748

(Continued)

FOREIGN PATENT DOCUMENTS

CN  106533959 A  3/2017
CN  108418767 A  8/2018

(Continued)

OTHER PUBLICATIONS

Yixiao Gao et al, DCQCN+: Taming Large-scale Incast Congestion in RDMA over Ethernet Networks, 2018 IEEE 26th International Conference on Network Protocols, 11 pages.

*Primary Examiner* — Dung B Huynh
(74) *Attorney, Agent, or Firm* — WOMBLE BOND DICKINSON (US) LLP

(57) ABSTRACT

This application describes a congestion control method and apparatus. In this application, a network device obtains time information of one or more congestion packets in a sent first data stream, where the one or more congestion packet carries a flag indicating a congestion notification. When the first data stream is congested, the network device obtains a first congestion notification packet based on the time information of the one or more congestion packets in the first data stream, where the first congestion notification packet notifies that a packet is congested beyond a first specified interval. The network device then sends the first congestion notification packet. According to the solutions in this application, (Continued)

a rate of a data stream can be prevented from being increased when the data stream is congested, and packet transmission efficiency is improved.

18 Claims, 15 Drawing Sheets

(51) Int. Cl.
*H04L 47/10* (2022.01)
*H04L 47/122* (2022.01)

(56) References Cited

U.S. PATENT DOCUMENTS

| | | | | |
|---|---|---|---|---|
| 6,226,265 | B1* | 5/2001 | Nakamichi | H04L 12/5602 370/235 |
| 6,424,624 | B1* | 7/2002 | Galand | H04L 12/5601 370/231 |
| 6,621,799 | B1* | 9/2003 | Kemp | H04L 1/188 370/282 |
| 6,977,899 | B1* | 12/2005 | Matragi | H04L 65/1069 370/230.1 |
| 7,035,214 | B1* | 4/2006 | Seddigh | H04L 1/1635 370/231 |
| 8,516,121 | B1* | 8/2013 | Telang | H04L 41/0896 709/212 |
| 8,593,970 | B2* | 11/2013 | Godbole | H04L 49/9078 370/235 |
| 8,699,343 | B2* | 4/2014 | Abdelal | H04L 65/613 370/235 |
| 8,792,352 | B2* | 7/2014 | Bergamasco | H04L 43/0882 370/236 |
| 9,112,784 | B2* | 8/2015 | Chen | H04L 47/10 |
| 9,369,391 | B2* | 6/2016 | Mahindra | H04L 47/19 |
| 9,887,921 | B2* | 2/2018 | Thyni | H04W 36/0005 |
| 10,277,512 | B1* | 4/2019 | Williams | H04L 47/36 |
| 10,531,365 | B2* | 1/2020 | Kaur | H04W 48/10 |
| 10,735,339 | B1* | 8/2020 | Matthews | H04L 47/562 |
| 10,917,504 | B1* | 2/2021 | Plenderleith | H04L 61/5007 |
| 11,410,570 | B1* | 8/2022 | Yang | H04L 41/122 |
| 11,438,243 | B2* | 9/2022 | Ippatapu | H04L 43/0829 |
| 11,483,046 | B1* | 10/2022 | Tsai | H04L 1/203 |
| 11,632,334 | B2* | 4/2023 | Sugiyama | H04L 47/25 370/325 |
| 2002/0136163 | A1* | 9/2002 | Kawakami | H04L 47/26 370/229 |
| 2003/0023893 | A1* | 1/2003 | Lee | H04L 45/28 714/4.5 |
| 2003/0088690 | A1* | 5/2003 | Zuckerman | H04L 47/32 709/232 |
| 2004/0008628 | A1* | 1/2004 | Banerjee | H04L 47/28 370/468 |
| 2004/0037223 | A1* | 2/2004 | Harrison | H04L 45/50 370/235 |
| 2004/0066743 | A1* | 4/2004 | Shimojo | H04L 49/25 370/445 |
| 2004/0073361 | A1* | 4/2004 | Tzamaloukas | H04W 8/04 701/414 |
| 2005/0013246 | A1* | 1/2005 | Miyake | H04L 1/187 370/498 |
| 2006/0187836 | A1* | 8/2006 | Frey | H04L 47/11 370/235 |
| 2006/0291452 | A1* | 12/2006 | Velagaleti | H04L 1/1671 370/352 |
| 2007/0104096 | A1* | 5/2007 | Ribera | H04L 45/22 370/229 |
| 2007/0133416 | A1* | 6/2007 | Hyon | H04W 28/0273 370/235 |
| 2008/0075003 | A1* | 3/2008 | Lee | H04L 47/805 370/235 |
| 2008/0259798 | A1* | 10/2008 | Loh | H04L 47/125 370/235 |
| 2008/0267073 | A1* | 10/2008 | Thaler | H04L 47/10 370/236 |
| 2009/0232001 | A1* | 9/2009 | Gong | H04L 47/10 370/236 |
| 2009/0327844 | A1* | 12/2009 | Suneya | H04L 47/10 714/776 |
| 2010/0014419 | A1* | 1/2010 | Lee | H04W 80/06 370/225 |
| 2010/0182907 | A1* | 7/2010 | Pinter | H04L 47/18 370/235 |
| 2010/0202309 | A1* | 8/2010 | Suneya | H04L 1/0057 370/252 |
| 2010/0274871 | A1* | 10/2010 | Harrang | H04L 67/30 709/217 |
| 2011/0170408 | A1* | 7/2011 | Furbeck | H04W 28/0284 370/230 |
| 2011/0205898 | A1* | 8/2011 | Ichiki | H04L 45/127 370/252 |
| 2011/0261696 | A1* | 10/2011 | Crisan | H04L 45/00 370/235 |
| 2011/0261758 | A1* | 10/2011 | Hapsari | H04L 65/65 370/328 |
| 2012/0039169 | A1* | 2/2012 | Susitaival | H04W 8/04 370/230 |
| 2013/0010598 | A1* | 1/2013 | Ludwig | H04L 47/26 370/235 |
| 2013/0013664 | A1* | 1/2013 | Baird | H04L 67/1001 709/203 |
| 2013/0176847 | A1* | 7/2013 | Zhao | H04L 47/40 370/230 |
| 2013/0272120 | A1* | 10/2013 | Ai | H04W 28/0289 370/230 |
| 2013/0279341 | A1* | 10/2013 | Bahr | H04W 28/0289 370/237 |
| 2013/0294244 | A1* | 11/2013 | Fujita | H04W 28/021 370/235 |
| 2013/0343193 | A1* | 12/2013 | Kwan | H04L 47/11 370/235 |
| 2014/0016461 | A1* | 1/2014 | Ishikawa | H04L 47/31 370/230 |
| 2014/0043975 | A1* | 2/2014 | Zhu | H04L 47/283 370/235 |
| 2014/0071815 | A1* | 3/2014 | Gu | H04W 52/367 370/229 |
| 2014/0120859 | A1* | 5/2014 | Ekici | H04W 4/90 455/450 |
| 2014/0126362 | A1* | 5/2014 | Ogura | H04W 28/0284 370/230 |
| 2014/0153387 | A1* | 6/2014 | Wu | H04L 47/36 370/252 |
| 2014/0164640 | A1* | 6/2014 | Ye | H04L 47/30 709/235 |
| 2014/0164641 | A1* | 6/2014 | Ye | H04L 47/127 709/235 |
| 2014/0169513 | A1* | 6/2014 | Park | H04L 7/007 375/354 |
| 2014/0233390 | A1* | 8/2014 | Schmid | H04L 47/125 370/236 |
| 2014/0254357 | A1* | 9/2014 | Agarwal | H04L 47/12 370/229 |
| 2014/0269269 | A1* | 9/2014 | Kovvali | H04W 24/04 370/252 |
| 2015/0016250 | A1* | 1/2015 | Flinta | H04L 47/34 370/230 |
| 2015/0029853 | A1* | 1/2015 | Raindel | H04L 12/4633 370/235 |
| 2015/0029887 | A1* | 1/2015 | Briscoe | H04L 47/31 370/252 |
| 2015/0055472 | A1* | 2/2015 | Skarby | H04W 28/0252 370/235 |
| 2015/0055478 | A1* | 2/2015 | Tabatabaee | H04L 47/11 370/235 |
| 2015/0078171 | A1* | 3/2015 | Gai | H04W 28/0268 370/237 |
| 2015/0089045 | A1* | 3/2015 | Agarwal | H04L 43/024 709/224 |

(56) References Cited

U.S. PATENT DOCUMENTS

| | | | |
|---|---|---|---|
| 2015/0092580 A1* | 4/2015 | Park | H04L 43/10 370/252 |
| 2015/0117205 A1* | 4/2015 | Palyi | H04L 47/32 370/235 |
| 2015/0156666 A1* | 6/2015 | Won | H04W 28/0289 370/229 |
| 2015/0195751 A1* | 7/2015 | Aoyagi | H04W 76/16 370/331 |
| 2015/0281102 A1* | 10/2015 | Lee | H04L 47/621 370/236 |
| 2015/0281106 A1* | 10/2015 | Lee | H04L 45/38 370/236 |
| 2015/0286805 A1* | 10/2015 | Lin | H04L 63/0428 713/168 |
| 2015/0295827 A1* | 10/2015 | Zhu | H04L 65/80 370/230 |
| 2015/0295839 A1* | 10/2015 | Birke | H04L 47/30 370/230 |
| 2015/0341273 A1* | 11/2015 | Naouri | H04L 47/18 370/231 |
| 2015/0372949 A1* | 12/2015 | Eardley | H04L 49/508 370/229 |
| 2016/0014030 A1* | 1/2016 | Thyni | H04L 47/122 370/237 |
| 2016/0029431 A1* | 1/2016 | Shimizu | H04W 76/38 370/252 |
| 2016/0182432 A1* | 6/2016 | De | H04L 69/28 709/204 |
| 2016/0182664 A1* | 6/2016 | Kobayashi | H04L 12/1859 709/217 |
| 2016/0226772 A1* | 8/2016 | Srinivasan | H04L 47/215 |
| 2016/0261512 A1* | 9/2016 | Lautenschlaeger | H04L 47/283 |
| 2016/0302197 A1* | 10/2016 | Xie | H04L 12/6418 |
| 2016/0344631 A1* | 11/2016 | Krishnamurthy | H04L 12/56 |
| 2017/0048144 A1* | 2/2017 | Liu | H04L 47/122 |
| 2017/0064602 A1* | 3/2017 | Kotecha | H04W 28/0226 |
| 2017/0070910 A1* | 3/2017 | Cartigny | H04L 47/11 |
| 2017/0078176 A1* | 3/2017 | Lakshmikantha | H04L 43/0852 |
| 2017/0093699 A1* | 3/2017 | Crupnicoff | H04L 47/263 |
| 2017/0099162 A1* | 4/2017 | Kanda | H04L 13/14 |
| 2017/0164238 A1* | 6/2017 | Paredes Cabrera | H04W 28/22 |
| 2017/0171812 A1* | 6/2017 | Guo | H04W 52/0212 |
| 2017/0187641 A1* | 6/2017 | Lundqvist | H04L 47/621 |
| 2017/0353478 A1* | 12/2017 | Ishikawa | H04L 63/0236 |
| 2017/0366374 A1* | 12/2017 | Osuga | H04L 47/31 |
| 2018/0077078 A1* | 3/2018 | Huang | H04M 3/42382 |
| 2018/0091388 A1* | 3/2018 | Levy | H04L 43/12 |
| 2018/0176283 A1* | 6/2018 | Sano | G05B 15/02 |
| 2018/0376535 A1* | 12/2018 | Yasuda | H04W 76/30 |
| 2019/0020563 A1* | 1/2019 | Meilik | H04L 43/16 |
| 2019/0059023 A1* | 2/2019 | Forsman | H04L 47/26 |
| 2019/0068327 A1* | 2/2019 | Ho | H04L 1/0009 |
| 2019/0068502 A1* | 2/2019 | Shiraki | H04L 47/12 |
| 2019/0068503 A1* | 2/2019 | Wei | H04L 47/24 |
| 2019/0089644 A1* | 3/2019 | Shpiner | H04L 49/30 |
| 2019/0089645 A1* | 3/2019 | Fu | H04L 47/28 |
| 2019/0103913 A1* | 4/2019 | Cooper | H04B 7/18586 |
| 2019/0116126 A1 | 4/2019 | Shen et al. | |
| 2019/0230009 A1* | 7/2019 | Yousuf | H04L 69/22 |
| 2019/0268807 A1* | 8/2019 | Babu | H04W 28/0284 |
| 2019/0319882 A1* | 10/2019 | Yuan | H04L 47/28 |
| 2019/0342199 A1 | 11/2019 | Hurson et al. | |
| 2019/0349951 A1* | 11/2019 | Ahmad | H04W 76/14 |
| 2019/0391943 A1* | 12/2019 | Hayakawa | G06F 12/1458 |
| 2020/0021532 A1* | 1/2020 | Borikar | H04L 49/90 |
| 2020/0068429 A1* | 2/2020 | Nagakubo | H04W 40/34 |
| 2020/0120029 A1* | 4/2020 | Sankaran | H04L 47/803 |
| 2020/0143669 A1* | 5/2020 | Mulcahy | G06N 7/01 |
| 2020/0169509 A1* | 5/2020 | Tigli | H04L 47/2491 |
| 2020/0177495 A1* | 6/2020 | Inoue | H04L 45/70 |
| 2020/0177513 A1* | 6/2020 | Zhang | H04L 49/358 |
| 2020/0260294 A1* | 8/2020 | Zhang | H04W 16/18 |
| 2020/0304412 A1* | 9/2020 | McDonald | H04L 45/121 |
| 2020/0336426 A1* | 10/2020 | Tadimeti | H04L 43/087 |
| 2020/0382426 A1* | 12/2020 | Li | H04L 47/283 |
| 2020/0412660 A1* | 12/2020 | Ji | H04L 47/31 |
| 2021/0006500 A1* | 1/2021 | Dukkipati | G06F 9/45558 |
| 2021/0075547 A1* | 3/2021 | Tao | H04W 28/10 |
| 2021/0112006 A1* | 4/2021 | Francini | H04L 47/115 |
| 2021/0211368 A1* | 7/2021 | Zheng | H04L 43/0858 |
| 2021/0234919 A1* | 7/2021 | Paralikar | H04L 67/563 |
| 2021/0306280 A1* | 9/2021 | Dorofiyenko | H04L 47/11 |
| 2021/0306362 A1* | 9/2021 | Kubo | H04L 63/1458 |
| 2021/0344601 A1* | 11/2021 | Ye | H04L 47/12 |
| 2021/0399990 A1* | 12/2021 | Wang | H04L 47/50 |
| 2022/0038996 A1* | 2/2022 | Li | H04W 76/38 |
| 2022/0078118 A1* | 3/2022 | Ao | H04L 47/26 |
| 2022/0141137 A1* | 5/2022 | Lin | H04L 47/25 370/235 |
| 2022/0239589 A1* | 7/2022 | Uberoy | H04L 45/24 |
| 2022/0263767 A1* | 8/2022 | Zhang | H04L 49/358 |
| 2022/0264364 A1* | 8/2022 | Frink | H04L 47/623 |
| 2022/0311711 A1* | 9/2022 | Jepsen | H04L 47/27 |
| 2022/0360503 A1* | 11/2022 | Seenivasan | H04L 67/50 |
| 2022/0368633 A1* | 11/2022 | Liu | H04L 47/28 |
| 2023/0127924 A1* | 4/2023 | Srinivasan | H04W 28/0268 370/328 |
| 2023/0208771 A1* | 6/2023 | Han | H04L 47/25 370/235 |
| 2024/0080270 A1* | 3/2024 | Wang | H04L 47/115 |
| 2024/0304084 A1* | 9/2024 | Cabrera Castillo | G07C 9/15 |
| 2025/0039104 A1* | 1/2025 | Matthews | H04L 47/32 |
| 2025/0081033 A1* | 3/2025 | Yang | H04W 28/0268 |

FOREIGN PATENT DOCUMENTS

| | | |
|---|---|---|
| CN | 109039936 A | 12/2018 |
| WO | 2019029318 A1 | 2/2019 |
| WO | 2019210725 A1 | 11/2019 |

* cited by examiner

CONGESTION CONTROL METHOD AND APPARATUS

CROSS-REFERENCE TO RELATED APPLICATIONS

This application is a continuation of International Application No. PCT/CN2021/071251, filed on Jan. 12, 2021, which claims priority to Chinese Patent Application No. 202010077053.9, filed on Jan. 23, 2020. The disclosures of the aforementioned applications are hereby incorporated by reference in their entireties.

TECHNICAL FIELD

This application relates to the field of communications technologies, and in particular, to a congestion control method and apparatus.

BACKGROUND

To reduce delay in processing data on a server during network transmission, the data may be transmitted by using a remote direct memory access (RDMA) technology. An application program on a client can directly read from and write to a memory on the server. In the RDMA technology, data is directly sent and received through network interface cards (NICs) of end nodes by using a registered cache, all network protocols are deployed on the NICs, and the data does not need to pass through a network protocol stack of a host. This manner significantly reduces occupancy and overall latency of a central processing unit (CPU) in the host. There are two versions of an RDMA over converged Ethernet (RoCE) protocol: RoCEv1 and RoCEv2. A main difference between the two versions is: RoCEv1 is an RDMA protocol implemented based on an Ethernet link layer, and RoCEv2 is an RDMA protocol implemented based on a user datagram protocol (UDP) layer in the transmission control protocol/internet protocol (TCP/IP) protocol in the Ethernet.

After a network protocol that meets requirements of a high throughput, ultra-low latency, and low CPU overheads is deployed, a congestion control algorithm needs to be found to ensure reliable network transmission without a packet loss. Therefore, data center quantized congestion notification (DCQCN) is proposed. DCQCN stipulates that when a destination device receives a packet carrying an explicit congestion notification (ECN) flag (that is, a congestion encountered (CE) packet), it indicates that a network is congested. Therefore, the destination device transfers network congestion information to a source device. Therefore, RoCEv2 defines an explicit congestion notification (CNP) packet. If a CE packet arrives at a stream and the destination device does not send a CNP packet for the stream within n microseconds, the destination device immediately sends one CNP packet. To be specific, if a plurality of CE packets arrive at a stream within a period of time (e.g., n microseconds), the source device generates a largest of one CNP packet for the stream every n microseconds. On the destination device, when receiving one CNP packet, the destination device decreases a sending rate and updates a rate decrease factor. If the destination device does not receive a CNP packet within a continuous period of time, the destination device increases the sending rate according to a specific algorithm.

However, when there are a large number of streams, an average bandwidth that can be allocated to each stream is small. In this case, congestion easily occurs. FIG. 1 is a schematic diagram of a DCQCN rate control failure. For a stream that is congested, a packet interval (that is, a minimum interval at which the stream obtains a CNP packet) of each stream may be longer than an interval for rate increase. Due to congestion, a source device does not receive the CNP packet, and a rate of a congested data stream is increased. This may cause failure of rate control convergence, thereby affecting packet transmission efficiency.

SUMMARY

This application provides a congestion control method and apparatus, to prevent a rate of a data stream from being increased when the data stream is congested, and improve packet transmission efficiency.

According to a first aspect, a congestion control method is provided. The method includes: obtaining time information of one or more congestion packets in a sent first data stream, where the one or more congestion packet carries a congestion flag; if the first data stream is congested, obtaining, based on the time information of the one or more congestion packets in the first data stream, a first congestion notification packet, where the first congestion notification packet notifies that a packet is congested beyond a first specified interval; and sending the first congestion notification packet. This can prevent a rate of a data stream from being increased when the data stream is congested, and improve packet transmission efficiency. The congestion flag may be an ECN flag. A name of the congestion flag is not limited in this application. The congestion notification packet may be a CNP packet. A name of the congestion notification packet is not limited in this application.

In an embodiment, if the first data stream is congested, the obtaining, based on the time information of the one or more congestion packets in the first data stream, a first congestion notification packet includes: if an interval between current time and time of sending a first congestion packet is longer than or equal to the first specified interval, obtaining the first congestion notification packet, where the first congestion notification packet is the last packet in the first data stream sent before the current time. If a new congestion packet is not sent beyond a specified interval after one congestion packet is sent, a supplemented congestion notification packet needs to be sent to a source device, to prevent the source device from increasing the rate of the data stream. The interval may be a packet rate increase interval of the data stream.

In another embodiment, if an interval between current time and time of sending a first congestion packet is longer than or equal to the first specified interval, the obtaining the first congestion notification packet includes: starting a timer after the first congestion packet is sent, where timing duration of the timer is the first specified interval; and when the timing duration arrives, if a next packet in the first data stream is not sent, obtaining the first congestion notification packet. The timer starts when a previous congestion packet is sent. When the timing duration arrives, if the next packet is not sent, the supplemented congestion notification packet needs to be sent to the source device, to prevent the source device from increasing the rate of the data stream.

In another embodiment, if an interval between current time and time of sending a first congestion packet is longer than or equal to the first specified interval, the obtaining the first congestion notification packet includes: monitoring, based on a specified period, whether the interval between the current time and the time of sending the first congestion packet is longer than or equal to the first specified interval; and if the interval between the current time and the time of sending the first congestion packet is longer than or equal to the first specified interval, obtaining the first congestion notification packet. After the previous congestion packet is sent, whether the next packet is sent is periodically monitored. If the next packet is not sent, the supplemented congestion notification packet needs to be sent to the source device, to prevent the source device from increasing the rate of the data stream.

In another embodiment, if the first data stream is congested, the obtaining, based on the time information of the one or more congestion packets in the first data stream, a first congestion notification packet includes: if an interval between time of sending a second congestion packet and the time of sending the first congestion packet is longer than or equal to the first specified interval, obtaining the first congestion notification packet, where the first congestion packet is a previous packet of the second congestion packet, and the first congestion packet and the second congestion packet correspond to the first data stream. If an interval at which two congestion packets are sent is large, the supplemented congestion notification packet may be sent to the source device, to prevent the source device from increasing the rate of the data stream.

In another embodiment, the sending the first congestion notification packet includes: monitoring whether an interval between the current time and time of obtaining the first congestion packet is longer than or equal to a second specified interval; and if the interval between the current time and the time of obtaining the first congestion packet is longer than or equal to the second specified interval, sending the first congestion notification packet. After the supplemented congestion notification packet is obtained, the supplemented congestion notification packet may be sent after a delay. Therefore, the supplemented congestion notification packet may be sent as much as possible after a congestion notification packet of a previous congestion packet is sent and before a congestion notification packet of a next congestion packet is sent. However, there is no correspondence between the congestion notification packet and the congestion packet, and each congestion notification packet has same content. There is a specific correspondence between quantities of the sent congestion packets and the sent congestion notification packets. The second specified interval may be determined based on an interval between the time of sending the first congestion packet and time of receiving a second congestion notification packet sent by a destination device.

In another embodiment, the sending the first congestion notification packet includes: immediately sending the first congestion notification packet after obtaining the first congestion notification packet. If the congestion notification packet is immediately sent, the source device may receive the congestion notification in a timely manner, to reduce the rate in a timely manner.

In another embodiment, the method further includes: obtaining a transmission parameter of the one or more congestion packets in the first data stream; determining, based on the transmission parameter of the one or more congestion packets, that the first data stream is congested; and determining, based on the transmission parameter of the congestion packets, whether the data stream is congested.

In another embodiment, the method further includes: sampling and replicating, at a specified sampling rate, the one or more congestion packets in the first data stream, and obtaining a mirrored data stream corresponding to the first data stream, where the mirrored data stream includes one or more mirrored packets. A forwarding chip may identify and control congestion. Alternatively, a coprocessor may be added. The coprocessor samples and replicates a congestion packet in a data stream from the forwarding chip, to identify and control the congestion.

In another embodiment, the transmission parameter includes a quantity of packets and a packet length, and the determining, based on the transmission parameter of the one or more congestion packets, that the first data stream is congested includes: determining, based on a quantity of congestion packets in one or more first data streams in a first queue sent in a first time period and a congestion packet length, a congestion packet rate of the queue; and if the congestion packet rate of the queue is higher than or equal to a first rate threshold, determining that the first queue is congested and the first queue is in a congestion state. A congestion packet rate of one queue may be accurately determined based on a quantity of packets in one or more first data streams sent in the queue and a packet length, to determine whether the queue is congested. If the queue is congested, all data streams in the queue are congested.

In another embodiment, the method further includes: if the congestion packet rate of the queue is lower than or equal to a second rate threshold, determining that the first queue is not congested and the first queue exits the congestion state, where the second rate threshold is less than the first rate threshold. After the queue is congested, if the congestion packet rate of the queue is lower than a specified value, it is determined that the queue exits the congestion state. However, when the congestion packet rate is between the first rate threshold and the second rate threshold, the queue is still in the congestion state, and congestion of the queue needs to be controlled.

In another embodiment, the transmission parameter includes a sequence number or sequence numbers of the one or more congestion packets in the first data stream, and the determining, based on the transmission parameter of the one or more congestion packets, that the first data stream is congested includes: obtaining continuity of the sequence numbers of the congestion packets in the first data stream; and if the continuity is greater than or equal to a first threshold, determining that the first queue is congested and the first data stream is in the congestion state. For a single data stream, a packet header carries a sequence number of a packet. By obtaining continuity of the sequence numbers of the congestion packets in the data stream, the continuity of the congestion packets may be determined, to determine whether the data stream is congested. For example, the continuity of the sequence numbers of the congestion packets may be a quantity of consecutive sequence numbers of the congestion packets. Correspondingly, the continuity of the congestion packets may be a quantity of packets corresponding to the consecutive sequence numbers of the congestion packets. The quantity of consecutive sequence numbers of the congestion packets may be a quantity of consecutive sequence numbers in a sampled data stream. For another example, the continuity of the sequence numbers of the congestion packets may be a difference between the sequence numbers of the congestion packets. In a specific quantity of packets sent by the network device, if the difference between the sequence numbers of the congestion packets is less than a specified threshold, it may also be considered that the continuity of the sequence numbers of the congestion packets in the data stream is greater than the specified threshold, and the continuity of the congestion packets may be determined, to determine that the data stream is congested.

In another embodiment, the method further includes: if the continuity is less than or equal to a second threshold, determining that the first data stream is not congested and the first data stream exits the congestion state, where the second threshold is less than the first threshold. If the continuity of the sequence numbers of the congestion packets is less than a specific threshold, it may be determined that the data stream exits the congestion state.

According to a second aspect, a congestion control apparatus is provided. The congestion control apparatus includes: a first obtaining unit, configured to obtain time information of one or more congestion packets in a sent first data stream, where the one or more congestion packet carries a congestion flag; a second obtaining unit, configured to: if the first data stream is congested, obtain, based on the time information of the one or more congestion packets in the first data stream, a first congestion notification packet, where the first congestion notification packet notifies that a packet is congested beyond a first specified interval; and a first sending unit, configured to send the first congestion notification packet.

In an embodiment, the second obtaining unit is configured to: if an interval between current time and time of sending a first congestion packet is longer than or equal to the first specified interval, obtain the first congestion notification packet, where the first congestion notification packet is the last packet in the first data stream sent before the current time.

In another embodiment, the second obtaining unit includes: a starting unit, configured to start a timer after the first congestion packet is sent, where timing duration of the timer is the first specified interval; and a third obtaining unit, configured to: when the timing duration arrives, if a next packet in the first data stream is not sent, obtain the first congestion notification packet.

In another embodiment, the second obtaining unit includes: a first monitoring unit, configured to monitor, based on a specified period, whether the interval between the current time and the time of sending the first congestion packet is longer than or equal to the first specified interval; and a fourth obtaining unit, configured to: if the interval between the current time and the time of sending the first congestion packet is longer than or equal to the first specified interval, obtain the first congestion notification packet.

In another embodiment, the second obtaining unit is configured to: if an interval between time of sending a second congestion packet and the time of sending the first congestion packet is longer than or equal to the first specified interval, obtain the first congestion notification packet, where the first congestion packet is a previous packet of the second congestion packet, and the first congestion packet and the second congestion packet correspond to the first data stream.

In another embodiment, the first sending unit includes: a second monitoring unit, configured to monitor whether an interval between the current time and time of obtaining the first congestion packet is longer than or equal to a second specified interval; and a second sending unit, configured to: if the interval between the current time and the time of obtaining the first congestion packet is longer than or equal to the second specified interval, send the first congestion notification packet. The second specified interval may be determined based on the interval between the time of sending the first congestion packet and the time of receiving the second congestion notification packet sent by the destination device.

In another embodiment, the first sending unit is configured to immediately send the first congestion notification packet after obtaining the first congestion notification packet.

In another embodiment, the apparatus further includes: a fifth obtaining unit, configured to obtain a transmission parameter of the one or more congestion packets in the first data stream; and a first determining unit, configured to determine, based on the transmission parameter of the one or more congestion packets, that the first data stream is congested.

In another embodiment, the apparatus further includes: a sampling and replicating unit, configured to sample and replicate, at a specified sampling rate, the one or more congestion packets in the first data stream, and obtain a mirrored data stream corresponding to the first data stream, where the mirrored data stream includes one or more mirrored packets.

In another embodiment, the transmission parameter includes a quantity of packets and a packet length, and the first determining unit includes: a second determining unit, configured to determine, based on a quantity of congestion packets in one or more first data streams in a first queue sent in a first time period and a congestion packet length, a congestion packet rate of the queue; and a third determining unit, configured to: if the congestion packet rate of the queue is higher than or equal to a first rate threshold, determine that the first queue is congested and the first queue is in a congestion state.

In another embodiment, the apparatus further includes: a fourth determining unit, configured to: if the congestion packet rate of the queue is lower than or equal to a second rate threshold, determine that the first queue is not congested and the first queue exits the congestion state, where the second rate threshold is less than the first rate threshold.

In another embodiment, the transmission parameter includes a sequence number or sequence numbers of the one or more congestion packets in the first data stream, and the first determining unit includes: a sixth obtaining unit, configured to obtain continuity of the sequence numbers of the congestion packets in the first data stream; and a fifth determining unit, configured to: if the continuity is greater than or equal to a first threshold, determine that the first queue is congested and the first data stream is in the congestion state.

In another embodiment, the apparatus further includes: a sixth determining unit, configured to: if the continuity is less than or equal to a second threshold, determine that the first data stream is not congested and the first data stream exits the congestion state, where the second threshold is less than the first threshold.

According to a third aspect, a congestion control apparatus is provided. The congestion control apparatus includes a processor and a physical interface. The processor is configured to perform the method according to any one of the first aspect or the embodiments of the first aspect.

According to a fourth aspect, a computer-readable storage medium is provided. The computer-readable storage medium stores instructions, and when the instructions are run on a computer, the computer is enabled to perform the method in any one of the first aspect or the embodiments of the first aspect.

According to a fifth aspect, a computer program product including instructions is provided. When the computer program product is run on a computer, the computer is enabled to perform the method according to any one of the first aspect or the embodiments of the first aspect.

DESCRIPTION OF EMBODIMENTS

The following describes embodiments of this application with reference to the accompanying drawings in embodiments of this application.

Figure 1:
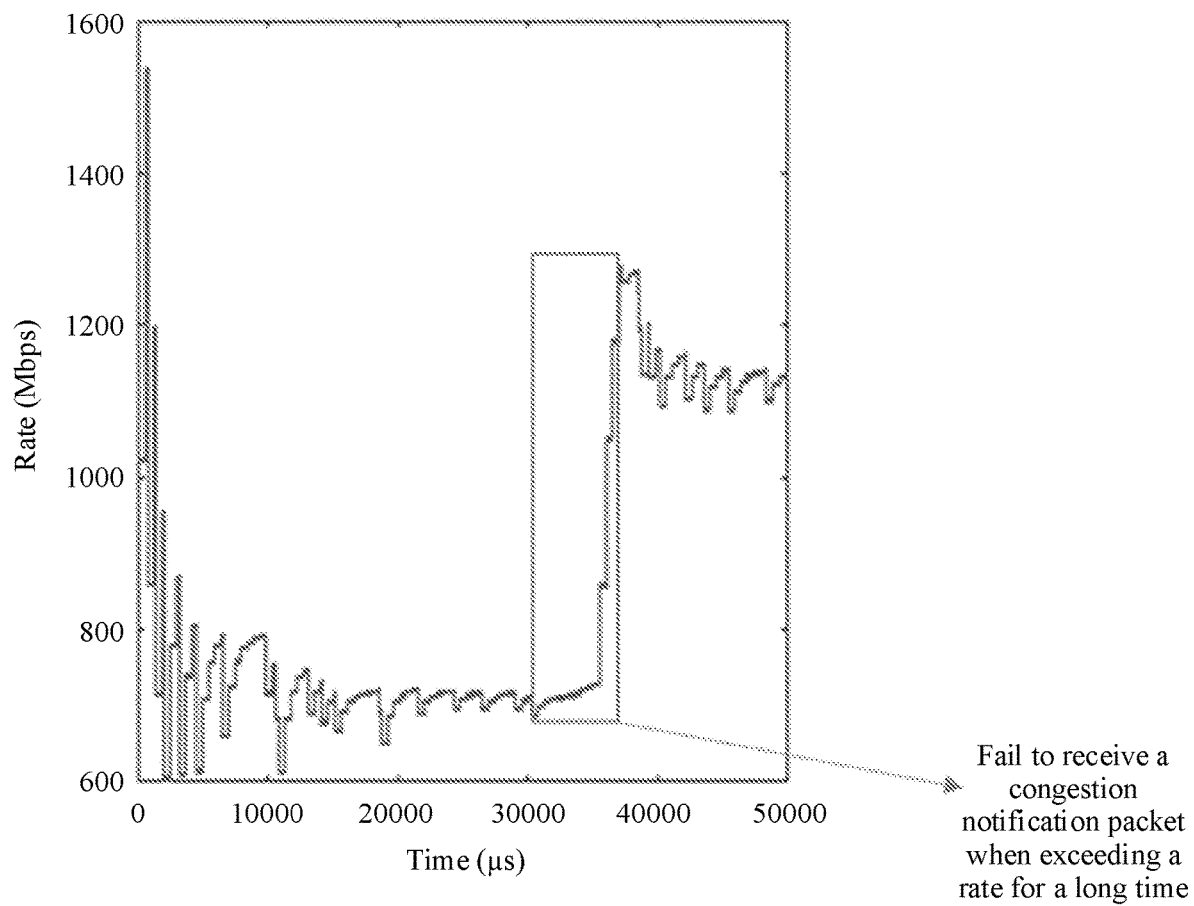
FIG. 1 is a schematic diagram of a DCQCN rate control failure.
Figure 2:
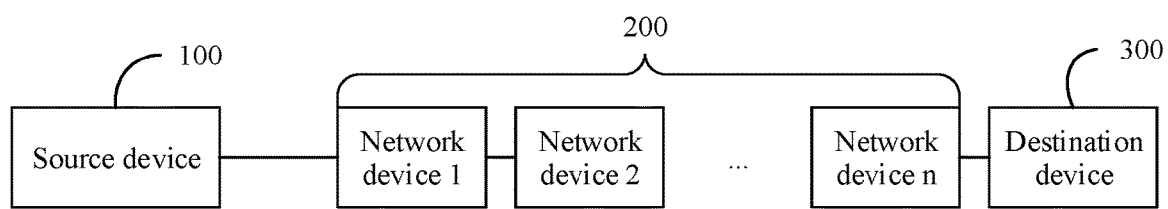
FIG. 2 is a schematic diagram of a structure of a communication system that performs a congestion control method according to an embodiment of this application.

FIG. 2 is a schematic diagram of a structure of a communication system that performs a congestion control method according to an embodiment of this application. Refer to FIG. 2. The communication system may include a source device 100, 1 to n network devices 200, and a destination device 300, where n≥1. The source device is a transmit end of a data stream, the destination device is a receive end of the data stream. The network device may be a switch or the like. In this embodiment of this application, the network device performs congestion control. In a communication system that implements a DCQCN-based congestion control algorithm, the source device may also be referred to as a reaction point (reaction point, RP), the network device may also be referred to as a congestion point (CP), and the destination device may also be referred to as a notification point (notification point, NP).

Figure 3:
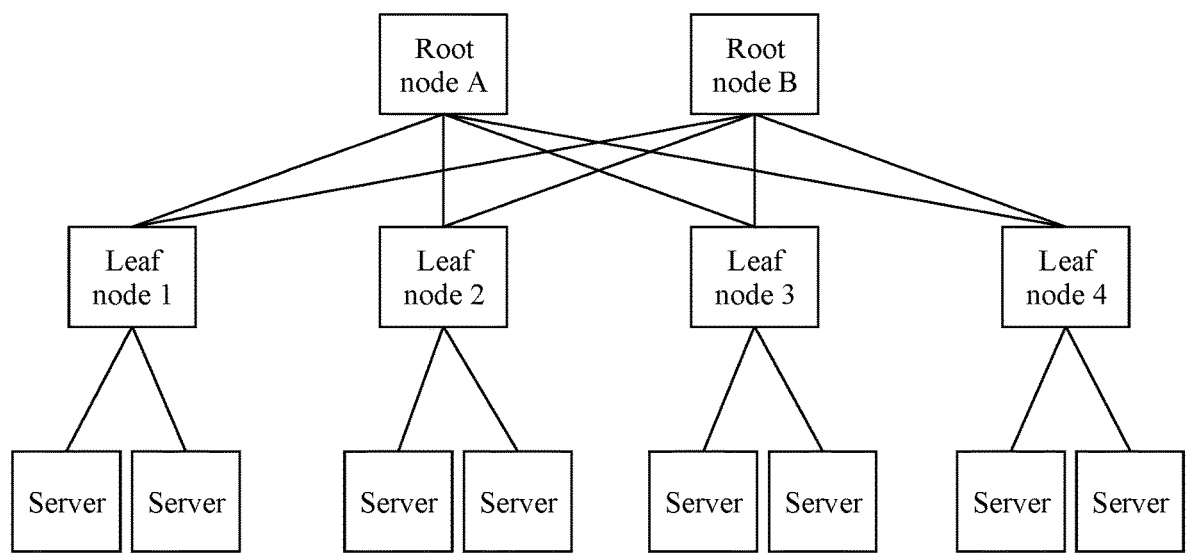
FIG. 3 is a schematic diagram of a typical scenario to which a congestion control method is applied according to an embodiment of this application.

FIG. 3 is a schematic diagram of a typical scenario to which a congestion control method is applied according to an embodiment of this application. Refer to FIG. 3. The scenario is a data center network, and the data center network may be applied to high-performance computing, high-performance distributed storage, big data, artificial intelligence, and the like. In the data center network, data is transmitted between a server and another server by using a leaf node or a root node. The data is transmitted by using an RDMA technology. Generally, a transmission rate between the server and the leaf node is lower than that between the leaf node and the root node. For example, the transmission rate between the server and the leaf node is 25 G/s, and the transmission rate between the leaf node and the root node is 100 G/s. Specifically, the data center network may be a CLOS network. The CLOS network includes a server, a core switch, and an access switch. The server accesses a network by using the access switch and the core switch. The source device may be one or more servers in the network. The destination device may be another one or more servers in the network. The network device may be the access switch and the core switch in the network.

According to the congestion control method and apparatus provided in this embodiment of this application, time information of a congestion packet in the data stream is obtained. If the data stream is congested, a congestion notification may be sent for a packet that is congested beyond a specified interval. This can prevent a rate of the data stream from being increased when the data stream is congested, and improve packet transmission efficiency.

Figure 4:
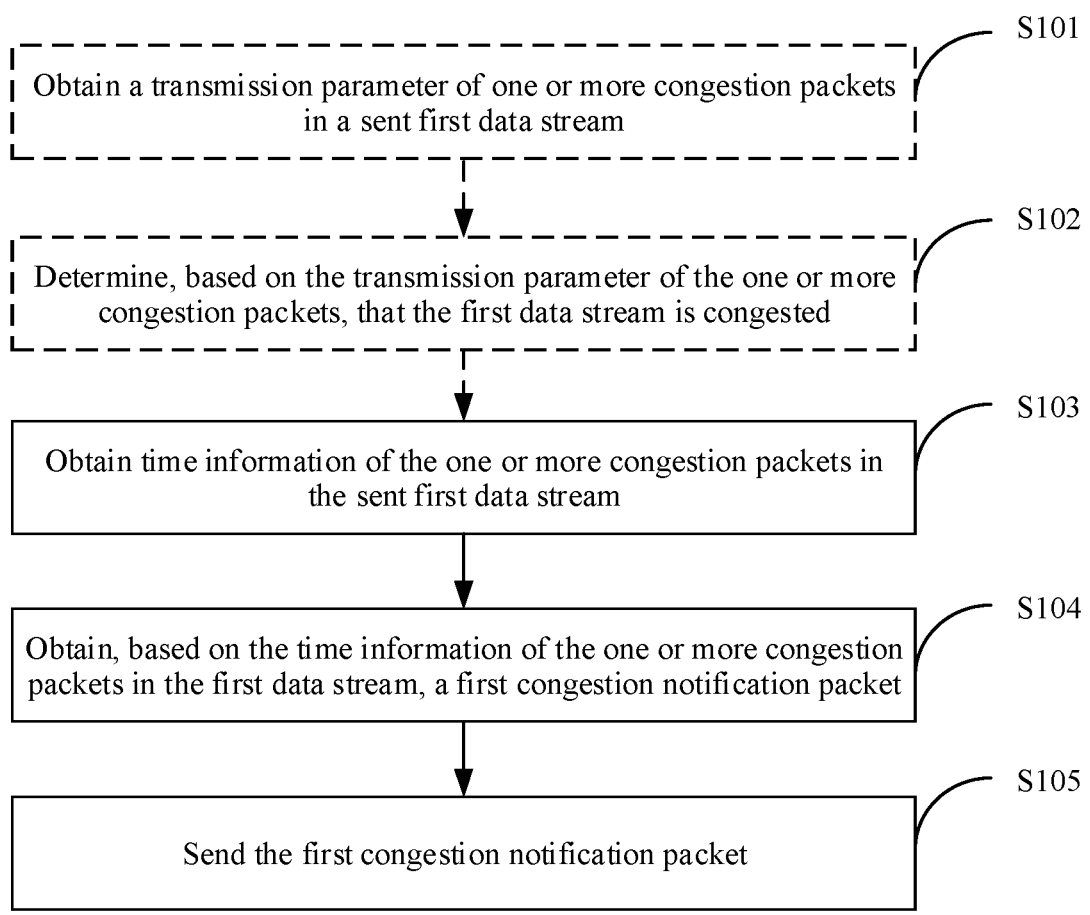
FIG. 4 is a flowchart of a congestion control method according to an embodiment of this application.

FIG. 4 is a flowchart of a congestion control method according to an embodiment of this application. Refer to FIG. 4. The congestion control method may include the following operations.

S101: Obtain a transmission parameter of one or more congestion packets in a sent first data stream.

The first data stream is a data stream sent by a source device to a destination device by using one or more network devices. The first data stream may be one data stream, or may be a plurality of data streams whose service types are different and whose source and destination are the same, that is, an aggregation traffic. Congestion identification and congestion control in this embodiment may be performed by any network device or each network device between the source device and the destination device. Specifically, the congestion identification and the congestion control in this embodiment may be performed by a forwarding chip or a coprocessor of the network device. If the congestion identification and the congestion control are performed by the forwarding chip, the forwarding chip may perform the congestion identification and the congestion control on a forwarded data stream without performing another operation. This ensures high timeliness. If the congestion identification and the congestion control are performed by the coprocessor, the coprocessor may sample and replicate a congestion packet forwarded by the forwarding chip, and then perform the congestion identification and the congestion control based on a mirrored data stream obtained through replication.

The first data stream may include a congestion packet and a common packet. Each packet carries corresponding content in the first data stream. The congestion packet refers to a packet marked with an ECN flag. The common packet refers to a packet without the ECN flag. In this embodiment, the network device focuses on the congestion packet in the first data stream.

The packet is transmitted among the network devices based on a corresponding transmission parameter. The transmission parameter includes a transmission rate, a packet length, a queue depth, and the like. The transmission parameter is important for whether the packet can be successfully transmitted to the destination device. Therefore, the transmission parameter of the congestion packets in the first data stream needs to be obtained.

S102: Determine, based on the transmission parameter of the one or more congestion packets, that the first data stream is congested.

A congestion packet received by the network device from an upstream device enters a queue of an egress port of the network device. The network device may include one or more queues. One or more data streams may enter one queue and wait to be sent. One queue has a specific depth. Based on the transmission parameter of the congestion packets, if it is determined that there are excessive congestion packets to be sent in the queue, it may be determined that the queue or the data stream in the queue is congested.

The operations S101 and S102 are optional operations and represented by dashed lines in the figure. To be specific, it is determined whether the data stream is congested before the following congestion control procedure is performed, or determined to perform the following congestion control procedure under a condition that the data stream is congested.

S103: Obtain time information of the one or more sent congestion packets in the first data stream, where the one or more congestion packet carries a congestion flag.

The network device may forward the congestion packets in the first data stream, and record the time information of sending the congestion packets. The time information may be, for example, absolute time or relative time of sending the congestion packets.

If the congestion control is performed by the forwarding chip, the forwarding chip only needs to record the time information of sending the congestion packets. If the congestion control is performed by the coprocessor, the forwarding chip records the time information of sending the congestion packets, and sends the time information to the coprocessor.

S104: Obtain, based on the time information of the one or more congestion packets in the first data stream, a first congestion notification packet, where the first congestion notification packet notifies that a packet is congested beyond a first specified interval.

On the destination device, when a CE packet arrives, the destination device immediately sends a CNP packet to notify the source device that the data stream is congested. On the source device, when the source device receives the CNP packet, the source device decreases a sending rate and updates a rate decrease factor. In addition, if the source device does not receive the CNP packet within a continuous period of time, the source device increases the sending rate according to a specific algorithm. However, when there is a large number of data streams, for a congested stream, an interval at which the data stream obtains a corresponding CNP packet may be longer than an interval at which the source device increases the sending rate. As a result, a rate of the data stream that is in a congestion state may be increased, which may cause failure of rate control convergence, and affect packet transmission efficiency.

Therefore, in this embodiment, if it is determined that the first data stream is congested, a first CNP packet needs to be obtained based on the obtained time information of the congestion packets in the first data stream, if there is the packet that is congested beyond the first specified interval. The first CNP packet notifies that the packet is congested beyond the first specified interval. That is, for a CE packet that is not sent, the destination device does not feed back the CNP packet, and the network device obtains the first CNP packet. The obtained first CNP packet may be a CNP packet that is generated and stored in the network device before being obtained, or may be a CNP packet generated in real time. The content of the CNP packet is the same as that of the CNP packet fed back by the destination device.

S105: Send the first congestion notification packet.

If there is the packet that is congested beyond the first specified interval, because the destination device does not receive the CE packet, the destination device does not feed back the CNP packet to the source device. In addition, if the source device does not receive the CNP packet within the continuous period of time, the source device increases the sending rate according to the specific algorithm. After obtaining the first CNP packet, the network device sends the first CNP packet to the source device, to notify the source device in a timely manner that the data stream is congested and the rate of the data stream cannot be increased, so that the rate of the data stream can be effectively controlled, and the packet transmission efficiency is improved.

According to the congestion control method provided in this embodiment of this application, the time information of the congestion packet in the data stream is obtained. If the data stream is congested, a congestion notification may be sent for a packet that is congested beyond a specified interval. This can prevent a rate of the data stream from being increased when the data stream is congested, and improve packet transmission efficiency.

Figure 5A:
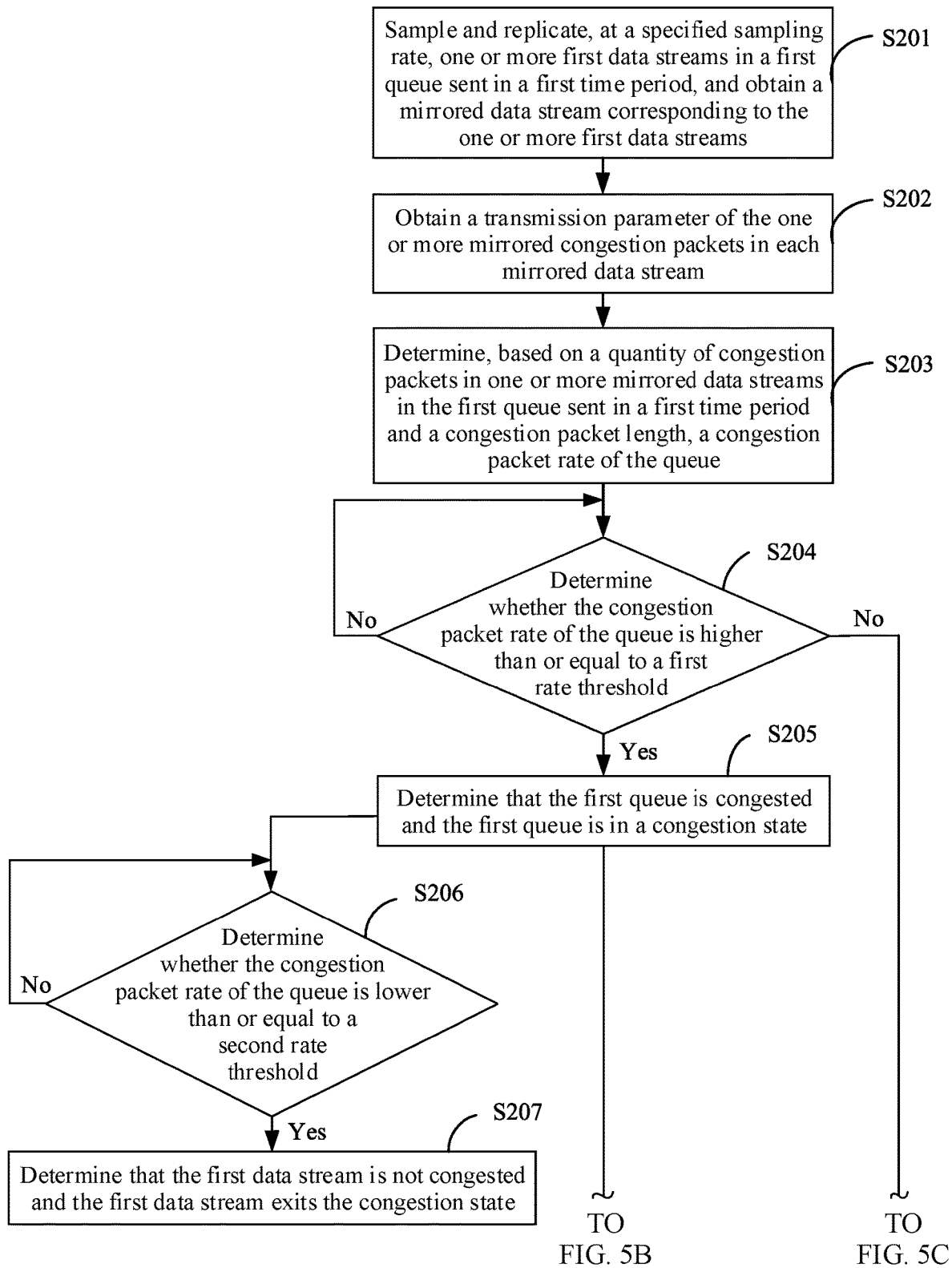
FIG. 5A, FIG. 5B, and FIG. 5C are flowcharts of another congestion control method according to an embodiment of this application.
Figure 5B:
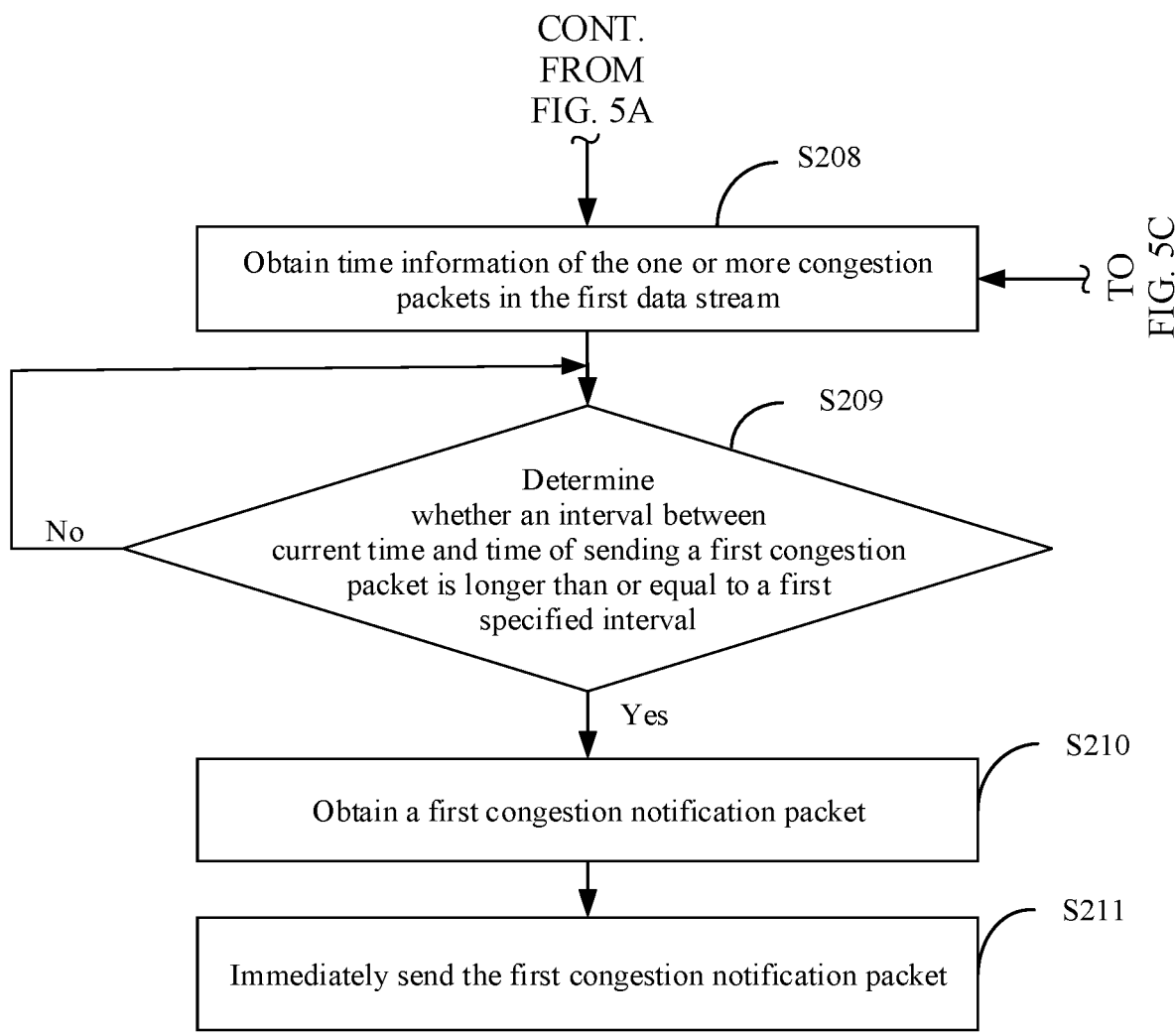
Figure 5C:
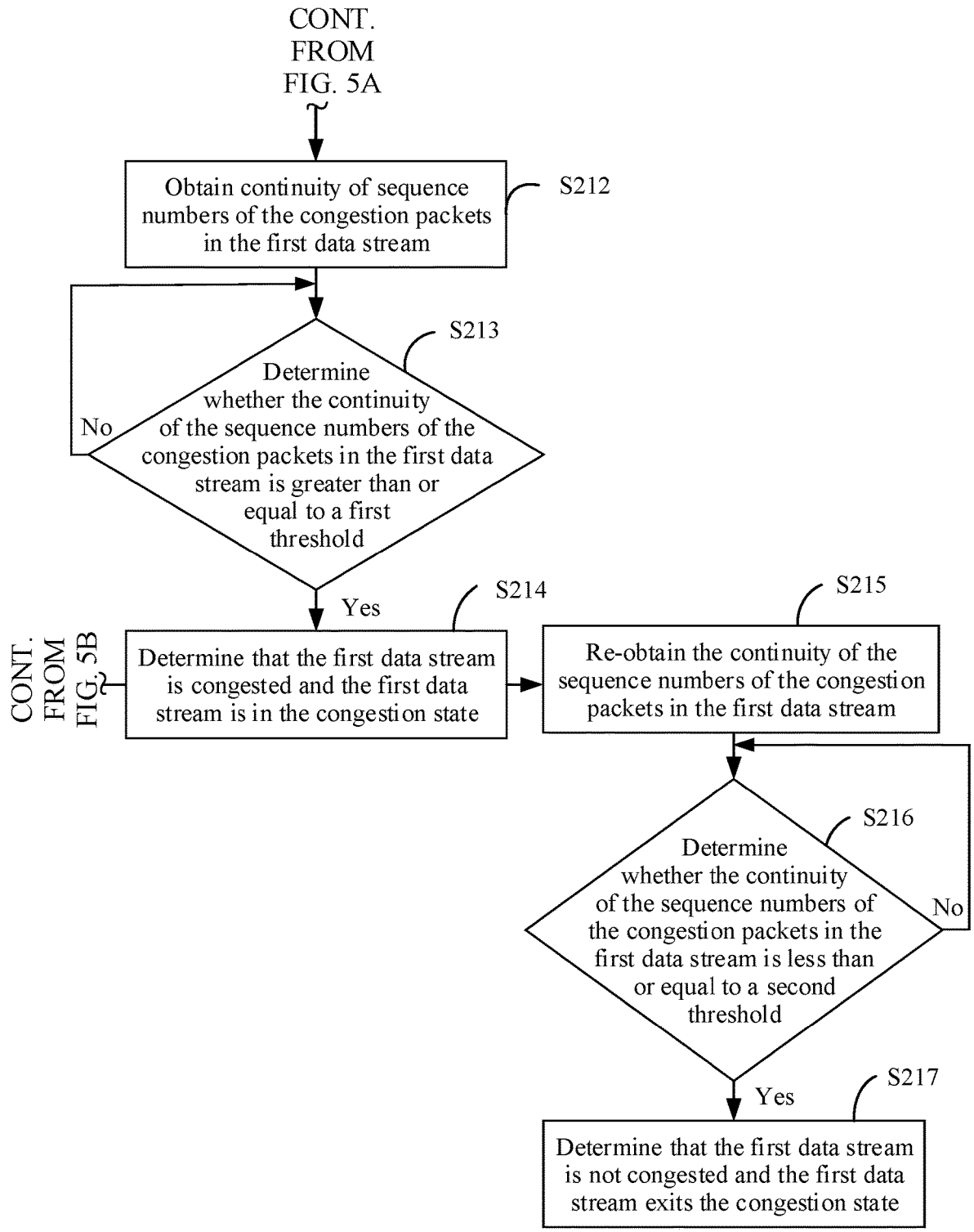

FIG. 5A, FIG. 5B, and FIG. 5C are flowcharts of another congestion control method according to an embodiment of this application. As shown in FIG. 5A, FIG. 5B, and FIG. 5C, the congestion control method may include the following operations.

S201: Sample and replicate, at a specified sampling rate, one or more first data streams in a first queue sent in a first time period, and obtain a mirrored data stream corresponding to the one or more first data streams, where each mirrored data stream includes one or more mirrored congestion packets.

In this embodiment, a coprocessor may identify and control congestion, and the coprocessor may replicate a data stream in a forwarding chip to obtain the mirrored data stream. One mirrored data stream includes the one or more mirrored congestion packets. Alternatively, the forwarding chip may perform the congestion identification and the congestion control. To be specific, the forwarding chip performs the congestion identification and the congestion on a forwarded data stream, and does not replicate the data stream. In other words, the operation of replicating the data stream is optional. This embodiment uses an example in which the coprocessor identifies and controls the congestion.

In addition, to improve efficiency of identifying and controlling the congestion, the data stream may be sampled at the specified sampling rate. Alternatively, the data stream may not be sampled, but all congestion packets may be processed.

A congestion packet received by the network device from an upstream device enters a queue of an egress port of the network device. The network device may include one or more queues. One or more data streams may enter one queue and wait to be sent. The foregoing congestion packet sampling and replication operations are performed on each data stream in each queue.

The following operations S202 to S207 identify whether the queue is congested.

S202: Obtain a transmission parameter of the one or more mirrored congestion packets in each mirrored data stream.

After obtaining the mirrored congestion packet, the coprocessor may obtain a header of the mirrored congestion packet, to obtain the transmission parameter of the mirrored congestion packet. The transmission parameter may include a quantity of congestion packets and a length of the congestion packet. For example, four data streams enter a first queue, and the coprocessor receives a total of N CE mirrored congestion packets of four mirrored data streams within 1 s. A length of each mirrored congestion packet is Mbit.

S203: Determine, based on a quantity of congestion packets in one or more mirrored data streams in the first queue sent in a first time period and a congestion packet length, a congestion packet rate of the queue.

The congestion packet rate of the queue may be determined based on a quantity of one or more mirrored congestion packets in each mirrored data stream in one queue and a packet length. The congestion packet rate of the queue is a rate of congestion packets entering the queue. For example, in the foregoing example, it may be determined that the congestion packet rate of the queue is N*Mbit/s.

S204: Determine whether the congestion packet rate of the queue is higher than or equal to a first rate threshold; if the congestion packet rate of the queue is higher than or equal to the first rate threshold, perform the operation S205; if the congestion packet rate of the queue is not higher than or equal to the first rate threshold, continue to perform the operation S204 or go to operation S212.

After the congestion packet rate of the queue is calculated, if the congestion packet rate of the queue exceeds a specific rate threshold, that is, the rate of the congestion packets entering the queue is high, and a large quantity of congestion packets are accumulated, it may be determined that the queue is congested and the queue is in a congestion state. Specifically, it is determined whether the congestion packet rate of the queue is higher than or equal to the first rate threshold. The first rate threshold may be a first specified proportion of a specified ROCE traffic value of the queue, for example, the specified ROCE traffic value of the queue * 90%. The specified ROCE traffic value of the queue is a ROCE traffic value preconfigured for each queue.

S205: Determine that the first queue is congested and the first queue is in the congestion state.

If the congestion packet rate of the queue is higher than or equal to the first rate threshold, it is determined that the first queue is congested and the first queue is in the congestion state. It may be understood that the first queue may be any queue in the network device, that is, the foregoing congestion identification operation may be performed on any queue.

S206: Determine whether the congestion packet rate of the queue is lower than or equal to a second rate threshold; if the congestion packet rate of the queue is higher than or equal to the second rate threshold, go to operation S207; if the congestion packet rate of the queue is not higher than or equal to the second rate threshold, continue to perform the operation S206.

After the first queue is in the congestion state, the congestion packet rate of the current queue is monitored. If the congestion packet rate of the queue decreases, it is determined whether the congestion packet rate of the queue is lower than or equal to the second queue rate threshold. If the congestion packet rate of the queue is lower than or equal to the second rate threshold, for example, if the congestion packet rate of the queue is lower than or equal to the specified ROCE traffic value of the queue * 60%, it is determined that the first queue is not congested and the first queue exits the congestion state. If the congestion packet rate of the queue is between the first rate threshold and the second rate threshold, continue to monitor whether the congestion packet rate of the queue is lower than or equal to the second rate threshold. The second rate threshold is lower than the first rate threshold. The second rate threshold may be a second specified proportion of the specified ROCE traffic value of the queue, for example, the specified ROCE traffic value of the queue * 60%.

S207: If the congestion packet rate of the queue is lower than or equal to the second rate threshold, it is determined that the first queue is not congested and the first queue exits the congestion state.

It can be learned from the foregoing example that if the congestion packet rate of the queue is higher than or equal to the specified ROCE traffic value of the queue * 90%, it is determined that the queue is congested. If the congestion packet rate of the queue is lower than the specified ROCE traffic value of the queue * 90% and higher than the specified ROCE traffic value of the queue * 60%, there are still many sent packets in the queue and the queue does not exit the congestion state. If the congestion packet rate of the queue is lower than or equal to the specified ROCE traffic value of the queue * 60%, it is determined that the queue is not congested and the queue exits the congestion state.

Figure 6:
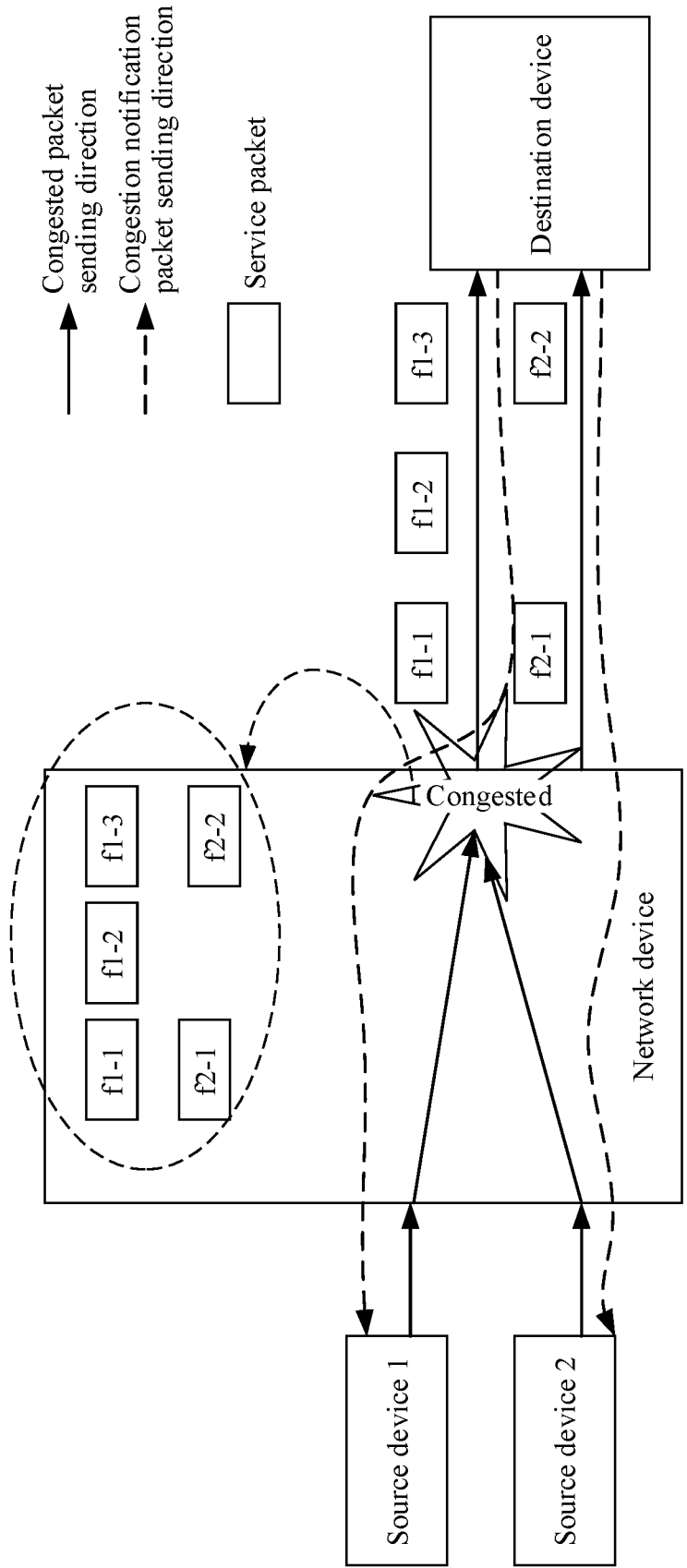
FIG. 6 is a schematic diagram of queue congestion identification.

Specifically, FIG. 6 is a schematic diagram of queue congestion identification. One or more data streams of a source device are sent to a destination device by using one or more network devices. One data stream includes one or more congestion packets. An egress port of the network device includes one or more queues. Each queue includes the one or more data streams. Queue congestion may be controlled by using the one or more network devices. As shown in FIG. 6, both a service stream 1 sent by a source device 1 and a service stream 2 sent by a source device 2 are sent to a same destination device through the network device, and both the service stream 1 and the service stream 2 enter a queue 1 of the network device. The service stream 1 and the service stream 2 each include several congestion packets. Congestion may be controlled by using the forwarding chip or the coprocessor of the network device.

For example, if congestion is controlled by using the coprocessor of the network device, the coprocessor obtains mirrored packets of CE packets in the service stream 1 and the service stream 2 included in the queue 1. Specifically, the coprocessor replicates CE packets forwarded by the forwarding chip, to obtain the mirrored packets of the CE packets. For example, the coprocessor obtains mirrored packets of CE packets f1-1, f1-2, and f1-3 in the service stream 1, and obtains mirrored packets of CE packets f2-1 and f2-2 in the service stream 2. Further, the CE packets in the service stream 1 and the service stream 2 may be sampled based on a specific sampling ratio.

Based on packet lengths of the CE packets f1-1, f1-2, f1-3, f2-1, and f2-2 in the queue 1, the coprocessor calculates a congestion packet rate of the queue 1, and determines whether the calculated congestion packet rate of the queue is higher than or equal to the first rate threshold. If a determining result is that the calculated congestion packet rate of the queue is higher than or equal to the first rate threshold, it is determined that the queue 1 is congested. If the determining result is that the calculated congestion packet rate of the queue is not higher than or equal to the first rate threshold, it is continuously determined whether the calculated congestion packet rate of the queue is higher than or equal to the first rate threshold. After it is determined that the queue 1 is congested, it is determined whether the calculated congestion packet rate of the queue is lower than or equal to the second rate threshold. If the calculated congestion packet rate of the queue is lower than or equal to the second rate threshold, it is determined that the queue 1 exits the congestion state. If the calculated congestion packet rate of the queue is not lower than or equal to the second rate threshold, it is continuously determined whether the calculated congestion packet rate of the queue is lower than or equal to the second rate threshold.

After it is determined that the first queue is congested, congestion needs to be controlled. The following operations S208 to S211 describe congestion control when it is determined that the queue is congested. It may be understood that if the first queue is congested, all data streams in the queue are congested. In this case, congestion control needs to be performed on each data stream according to the following operations S208 to S211.

S208: Obtain time information of the one or more congestion packets in the first data stream.

The forwarding chip forwards the packets in the first data stream, and record time information of sending congestion packets. The time information may be, for example, absolute time or relative time of sending the congestion packet.

After recording the time information of sending the congestion packets, the forwarding chip sends the time information to the coprocessor. The coprocessor obtains time information of the one or more mirrored congestion packets in each mirrored data stream.

S209: Determine whether an interval between current time and time of sending a first congestion packet is longer than or equal to a first specified interval. If the interval between the current time and the time of sending the first congestion packet is longer than or equal to the first specified interval, perform to the operation S210. If the interval between the current time and the time of sending the first congestion packet is not longer than or equal to the first specified interval, continue to perform the operation S209.

S210: Obtain a first congestion notification packet.

In this embodiment, the network device notifies that CE packets are congested beyond the first specified interval.

It can be determined whether the interval between the current time and the time of sending the first congestion packet is longer than or equal to the first specified interval. The current time may be system time of the network device. The first packet is the last packet sent before the current time. That is, it is determined how long a packet is not sent after the first packet is sent.

Specifically, in an embodiment, a timer may be disposed in the coprocessor. The timer starts when the first congestion packet is sent. Timing duration of the timer is the first specified interval. When the timing duration arrives, if a next congestion packet in the first data stream is not sent, a first CNP packet is obtained. The obtained first CNP packet may be a CNP packet that is generated and stored in the network device before being obtained, or may be a CNP packet generated in real time.

In another embodiment, it is monitored, based on a specified period, whether the interval between the current time and the time of sending the first congestion packet is longer than or equal to the first specified interval. If the interval between the current time and the time of sending the first congestion packet is longer than or equal to the first specified interval, the first CNP packet is obtained. In other words, every a specified period, it is determined whether the interval between the current time and the time of sending the first congestion packet is longer than or equal to the first specified interval. If the interval between the current time and the time of sending the first congestion packet is longer than or equal to the first specified interval, monitoring stops and the first CNP packet is obtained. If the interval between the current time and the time of sending the first congestion packet is shorter than or equal to the first specified interval, in a next period, it is continuously determined whether the interval between the current time and the time of sending the first congestion packet is longer than or equal to the first specified interval, until the interval between the current time and the time of sending the first congestion packet is longer than or equal to the first specified interval. The period is shorter than or equal to the first specified interval.

Alternatively, in an alternative manner of the operations S209 and S210, it is determined whether an interval between time of sending a second congestion packet and the time of sending the first congestion packet is longer than or equal to the first specified interval. If the interval between the time of sending the second congestion packet and the time of sending the first congestion packet is longer than or equal to the first specified interval, the first CNP packet is obtained. The first congestion packet is a previous packet of the second congestion packet. To be specific, it is determined, based on an interval at which the congestion packets are sent, whether the CE packets (e.g., second packets) are congested beyond the first specified interval.

Figure 7:
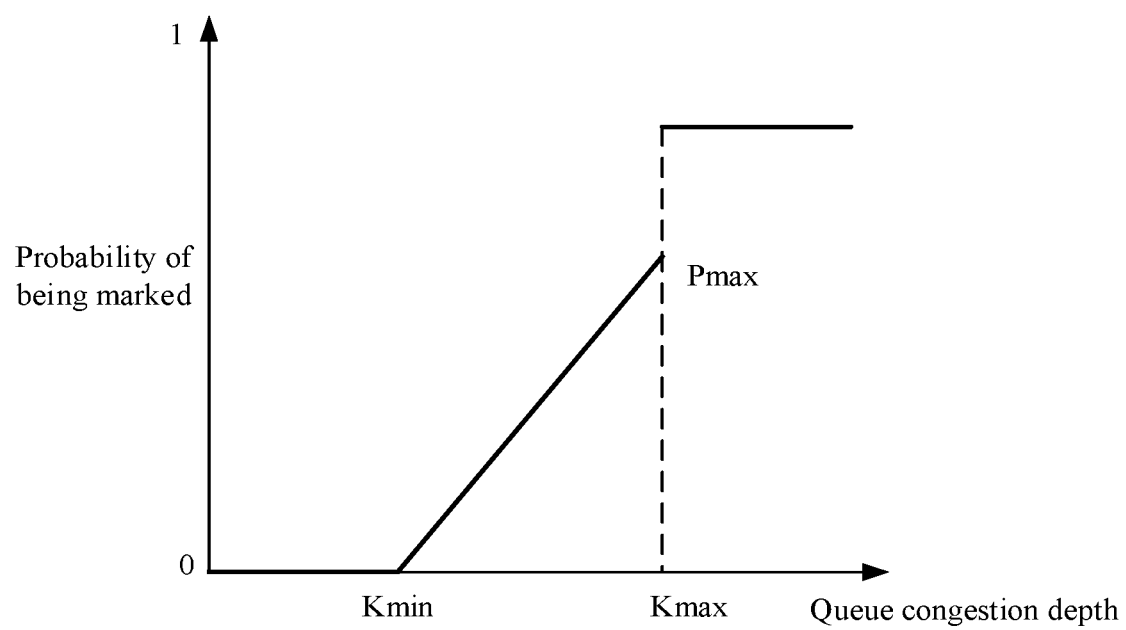
FIG. 7 is a schematic diagram of congestion identification based on a queue depth.

In another alternative manner of the operations S209 and S210, as shown in FIG. 7, it is determined whether a depth of an egress port queue exceeds a queue depth threshold. If the depth of the egress port queue exceeds the queue depth threshold, the network device adds an ECN flag to a new packet appearing in the egress port queue. FIG. 7 defines two queue depth thresholds: Kmin and Kmax. When a queue depth is less than or equal to Kmin, the ECN flag is not added to the packet. When the queue depth is greater than Kmax, the ECN flag is added to all packets passing through the queue. When the queue depth is between Kmin and Kmax, probability of adding the ECN flag is increased with the queue depth. When the destination device receives a CE packet with the ECN flag, it indicates that network is congested. Therefore, the destination device transfers congestion information of the network to the source device.

Figure 8:
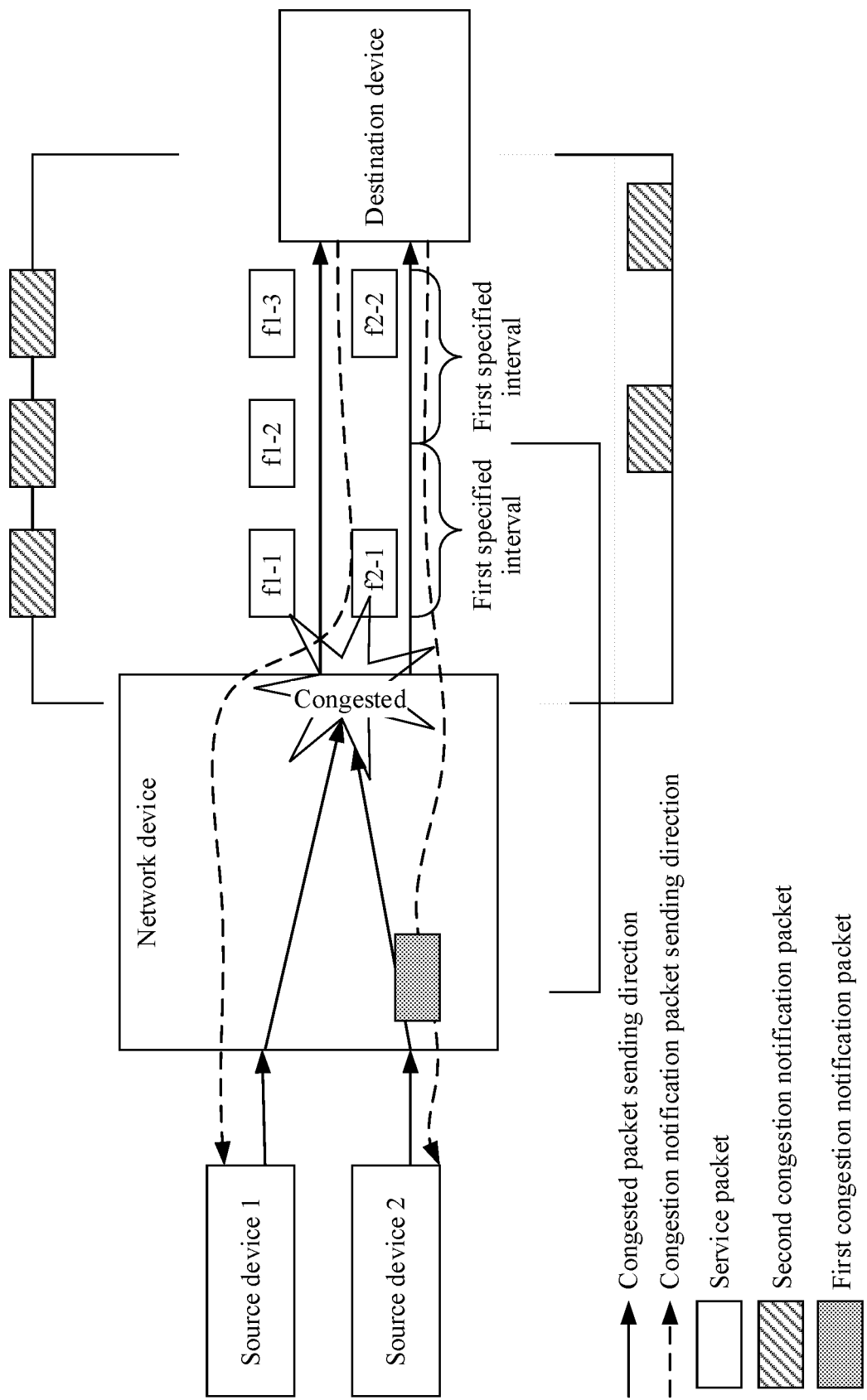
FIG. 8 is a schematic diagram of queue congestion control.

FIG. 8 is a schematic diagram of queue congestion control. After sending the CE packet f2-1, the network device records time of sending the CE packet f2-1, and then monitors, by using the timer or the specified period, whether an interval between the current time and the time of sending the packet f2-1 is longer than or equal to the first specified interval. When the interval between the current time and the time of sending f2-1 is longer than or equal to the first specified interval, if the network device does not send any CE packet, the network device obtains the first CNP packet. When receiving the CE packet f2-1, the destination device feeds back a second CNP packet to the source device. When receiving a CE packet f2-2, the destination device feeds back another second CNP packet to the source device. It may be understood that, the second CNP packet does not one-to-one correspond to the received CE packet in time, and may correspond to the received CE packet only in quantity. After f2-1 is sent, if the CE packet is not sent beyond the first specified interval, the destination device does not feed back the CNP packet. If the source device does not receive the CNP packet within a specific time period, the source device increases the rate of the data stream. This is contrary to a fact that the packet is congested in the queue of the network device. As a result, rate control fails. Therefore, the network device generates or obtains the first CNP packet when the interval between the current time and time of sending the first packet is longer than or equal to the first specified interval. The first specified interval may be a rate increase interval of the data stream.

S211: Immediately send the first CNP packet.

After obtaining the first CNP packet, the network device may immediately send the first CNP packet to the source device. Specifically, if the coprocessor starts the timer when sending the first congestion packet, the coprocessor sends the first CNP packet when the timing duration arrives. Therefore, the first CNP packet may be sent before the second CNP packets of the two CE packets, or between the second CNP packets of the two CE packets, or after the second CNP packets of the two CE packets.

Figure 9:
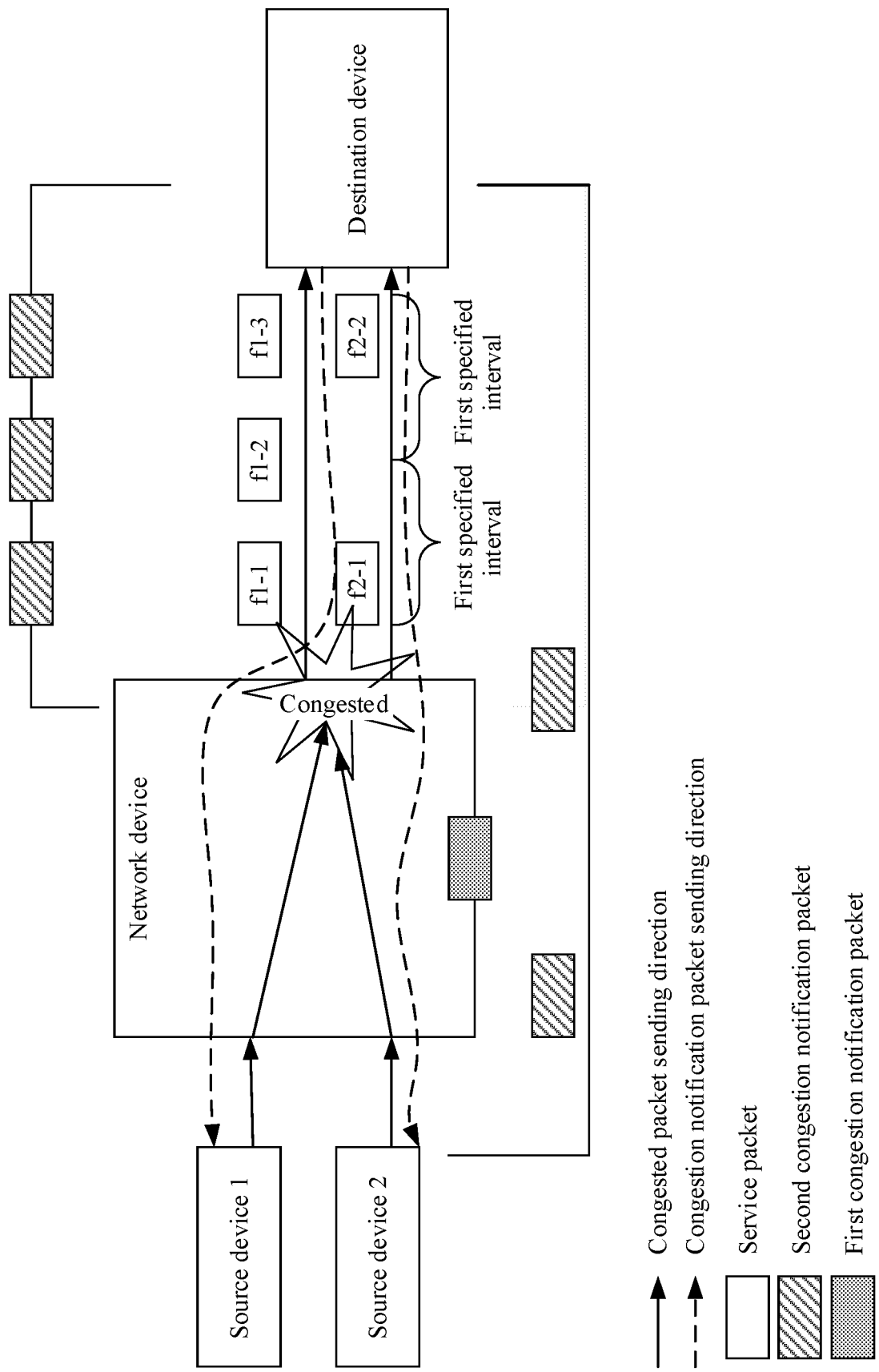
FIG. 9 is a schematic diagram of another queue congestion control.

In an alternative manner, the network device may also monitor whether an interval between the current time and time of obtaining the first CNP packet is longer than or equal to a second specified interval. The second specified interval is determined based on an interval between the time of sending the first congestion packet and time of receiving the second CNP packet sent by the destination device. If an interval between the current time and time of obtaining the first CNP packet is longer than or equal to the second specified interval, the first CNP packet is sent. FIG. 9 is a schematic diagram of another queue congestion control. The coprocessor may estimate the time of sending the CE packet f2-1 to the destination device and the time of receiving the second CNP packet. After the CE packet f2-1 is sent and before the CE packet f2-2 is sent, the first CNP packet may be sent, to ensure that the first CNP packet is located between the second CNP packets of the two CE packets as much as possible.

As shown in FIG. 5A, FIG. 5B, and FIG. 5C, if the first queue is not congested, it is determined to identify whether each data stream in the first queue is congested. The following operations S212 to S217 identify whether the first data stream is congested. The first data stream may be any data stream in the queue.

S212: If the congestion packet rate of the queue is lower than the first rate threshold, obtain continuity of sequence numbers of the congestion packets in the first data stream.

The transmission parameter may include the sequence numbers of congestion packets. The sequence numbers of the congestion packets may be obtained from the header of the congestion packet. Specifically, the coprocessor may obtain the header of the mirrored congestion packet, to obtain the sequence number of the congestion packet.

The continuity of the sequence numbers of the congestion packets may be that a quantity of consecutive sequence numbers of the congestion packets is greater than a specified value. In this case, the quantity of the sequence numbers of the congestion packets in the first data stream may be obtained.

The continuity of the sequence numbers of the congestion packets may also be that a largest value of a difference between the sequence numbers of the congestion packets is less than the specified value. In this case, the largest value of the difference between the sequence numbers of the congestion packets in the first data stream may be obtained.

Because the congestion packet has a unique sequence number, the continuity of the sequence numbers of the congestion packets corresponds to continuity of the congestion packets. Therefore, the continuity of the congestion packets may be determined based on the continuity of the sequence numbers of the congestion packets in the first data stream. The continuity of the sequence numbers of the congestion packets in the first data stream may be obtained through sampling. The sampled continuity of the sequence numbers of the congestion packets in the first data stream may indicate the continuity of the congestion packets.

S213: Determine whether the continuity of the sequence numbers of the congestion packets in the first data stream is greater than or equal to a first threshold. If the continuity of the sequence numbers of the congestion packets in the first data stream is greater than or equal to the first threshold, go to operation S214. If the continuity of the sequence numbers of the congestion packets in the first data stream is not greater than or equal to the first threshold, continue to perform the operation S213.

If the continuity of the sequence numbers in one data stream is greater than a specific threshold, it indicates that all sent packets are congestion packets. It may be determined that the data stream is congested and the data stream is in the congestion state. For example, the coprocessor receives CE packets forwarded by the forwarding chip: f1-1, f2-5, f1-3, f2-6, f1-4, f1-5, f1-6, and f1-7, where fi represents an $i^{th}$ data stream. If sequence numbers of a total of five packets f1-3, f1-4, f1-5, f1-6, and f1-7 in the first data stream are consecutive (for example, the first threshold is five packets), it is identified that f1 is a congestion stream.

For another example, in a specific quantity of packets sent by the network device, if the largest value of the differences between the sequence numbers of the congestion packets is less than a specified threshold, it may also be considered that the continuity of the sequence numbers of the congestion packets in the data stream is greater than the specified threshold. The continuity of the congestion packets may be determined, to determine that the data stream is congested. For example, if the network device sends 100 packets, among differences between sequence numbers of congestion packets, there is only one largest value that is 2, and the rest differences are all 1, it may be determined that 98 of the 100 packets sent by the network device are all congestion packets, and the data stream is congested.

S214: Determine that the first data stream is congested and the first data stream is in the congestion state.

Figure 10:
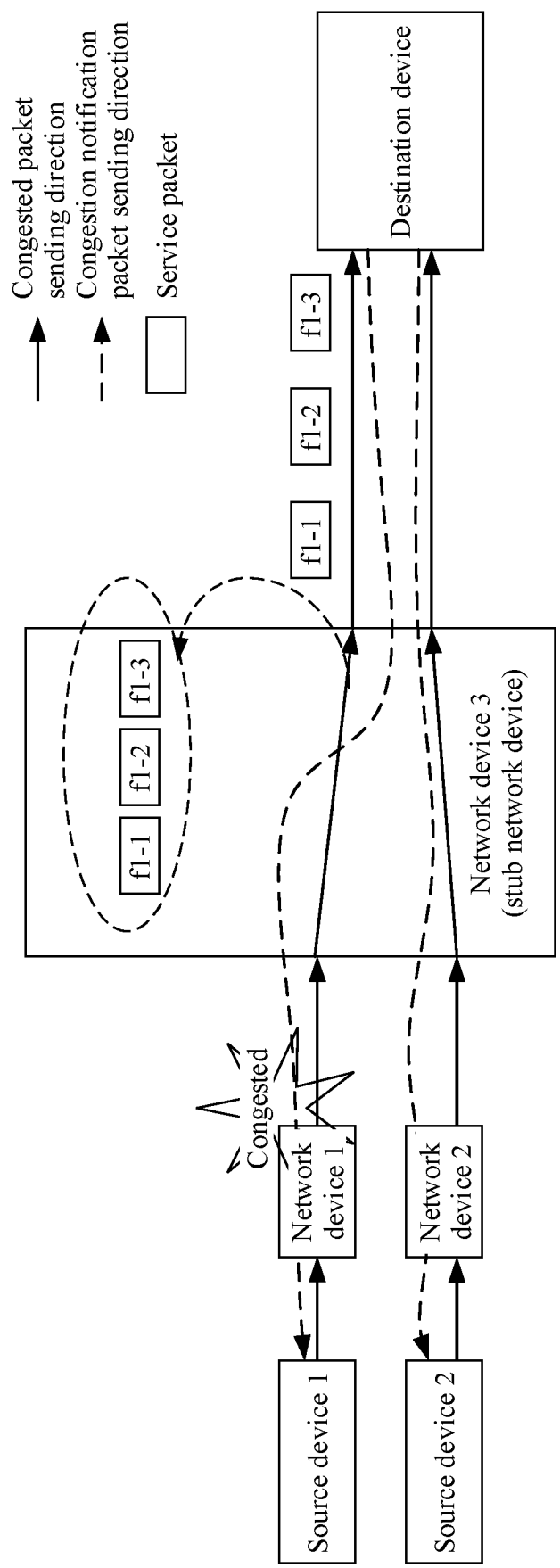
FIG. 10 is a schematic diagram of data stream congestion identification.

FIG. 10 is a schematic diagram of data stream congestion identification. The source device 1 and the source device 2 send the data stream to the same destination device. If a first data stream f1 is congested at a network device 1, the congestion identification may be performed at the network device 1 or a stub network device (a network device 3) close to the destination device. As shown in FIG. 10, a coprocessor of the network device 3 obtains three packets f1-1, f1-2, and f1-3 with consecutive sequence numbers in the data stream f1. If a quantity of packets corresponding to the consecutive sequence numbers is greater than or equal to 3, it may be determined that the data stream f1 is congested and the data stream f1 is in the congestion state.

S215: Re-obtain the continuity of the sequence numbers of the congestion packets in the first data stream.

After the first data stream is in the congestion state, whether the first data stream is in the congestion state or exits the congestion state needs to be monitored. In this case, the continuity of the sequence numbers of the congestion packets in the first data stream may be re-obtained.

If the continuity of the sequence numbers in the data stream is less than the specific threshold, it indicates that all sent packets are common packets. It may be determined that the data stream exits the congestion state.

For another example, in the specific quantity of packets sent by the network device, if the largest value of the difference between the sequence numbers of the congestion packets is greater than the specified threshold, it may also be considered that the continuity of the sequence numbers of the congestion packets in the data stream is less than the specified threshold, to determine that the data stream is not congested.

S216: Determine whether the continuity of the sequence numbers of the congestion packets in the first data stream is less than or equal to the second threshold. If the continuity of the sequence numbers of the congestion packets in the first data stream is less than or equal to the second threshold, go to operation S217. If the continuity of the sequence numbers of the congestion packets in the first data stream is not less than or equal to the second threshold, continue to perform the operation S216.

If the continuity of the sequence numbers of the sent packets in the first data stream is less than the specific threshold, it indicates that there are a few sent congestion packets in the first data stream. It may be determined that the data stream is not congested and the data stream exits the congestion state. For example, the coprocessor obtains CE packets forwarded by the forwarding chip: f1-1, f2-5, f1-3, f2-7, f1-4, f2-9, f1-5, f1-6, and f1-7, where fi represents an $i^{th}$ data stream. The packets f2-5, f2-7, and f2-9 in a data stream f2 are not consecutive, and two packets in a total of five packets f2-5 to f2-9 are missing. In this case, it is identified that f2 is not congested.

S217: Determine that the first data stream is not congested and the first data stream exits the congestion state.

Figure 11:
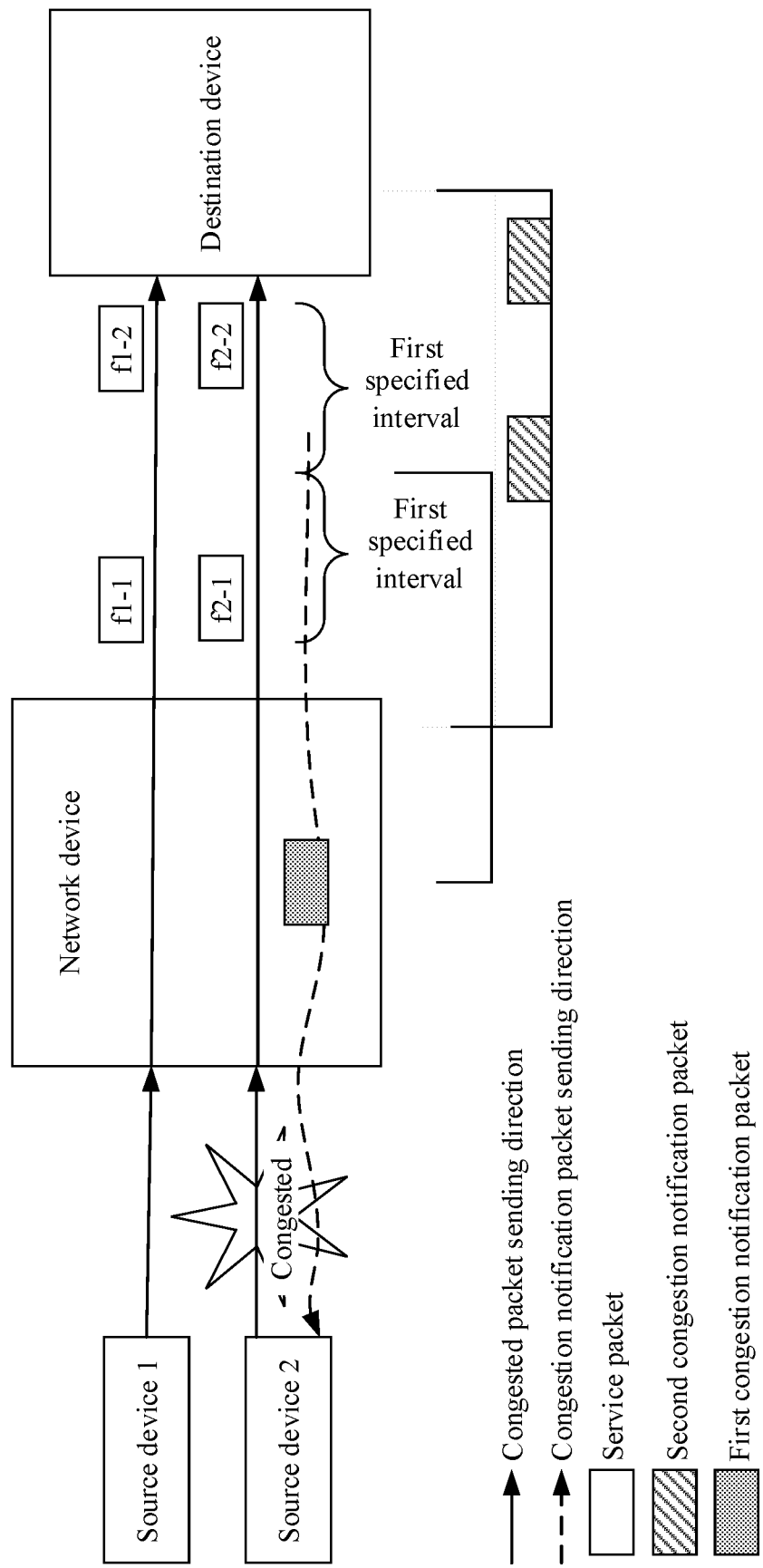
FIG. 11 is a schematic diagram of a stream congestion control.

After it is determined that the first data stream is congested, perform the operations S208 to S211, that is, perform the congestion control. A difference from the queue congestion control is: the operations S208 to S211 are performed to control the congestion of only the first data stream. FIG. 11 is a schematic diagram of stream congestion control. After sending the CE packet f2-1, the network device records time of sending the CE packet f2-1, and then monitors, by using the timer or the specified period, whether the interval between the current time and the time of sending the first congestion packet is longer than or equal to the first specified interval. When the interval between the current time and the time of sending the first congestion packet is longer than or equal to the first specified interval, if the network device does not send any CE packet, the network device obtains the first CNP packet. When receiving the CE packet f2-1, the destination device feeds back the second CNP packet to the source device. When receiving the CE packet f2-2, the destination device feeds back another second CNP packet to the source device. It may be understood that, the second CNP packet does not one-to-one correspond to the received CE packet in time, and may correspond to the received CE packet only in quantity. After f2-1 is sent, if the CE packet is not sent beyond the first specified interval, the destination device does not feed back the CNP packet. If the source device does not receive the CNP packet within the specific time period, the source device increases the rate of the data stream. This is contrary to the fact that the packet is congested in the queue of the network device. As a result, the rate control fails. Therefore, the network device generates or obtains the first CNP packet when the interval between the current time and the time of sending the first packet is longer than or equal to the first specified interval. The first specified interval may be the rate increase interval of the data stream.

After obtaining the first CNP packet, the network device may immediately send the first CNP packet to the source device. Therefore, the first CNP packet may be sent before the second CNP packets of the two CE packets, or between the second CNP packets of the two CE packets, or after the second CNP packets of the two CE packets.

Figure 12:
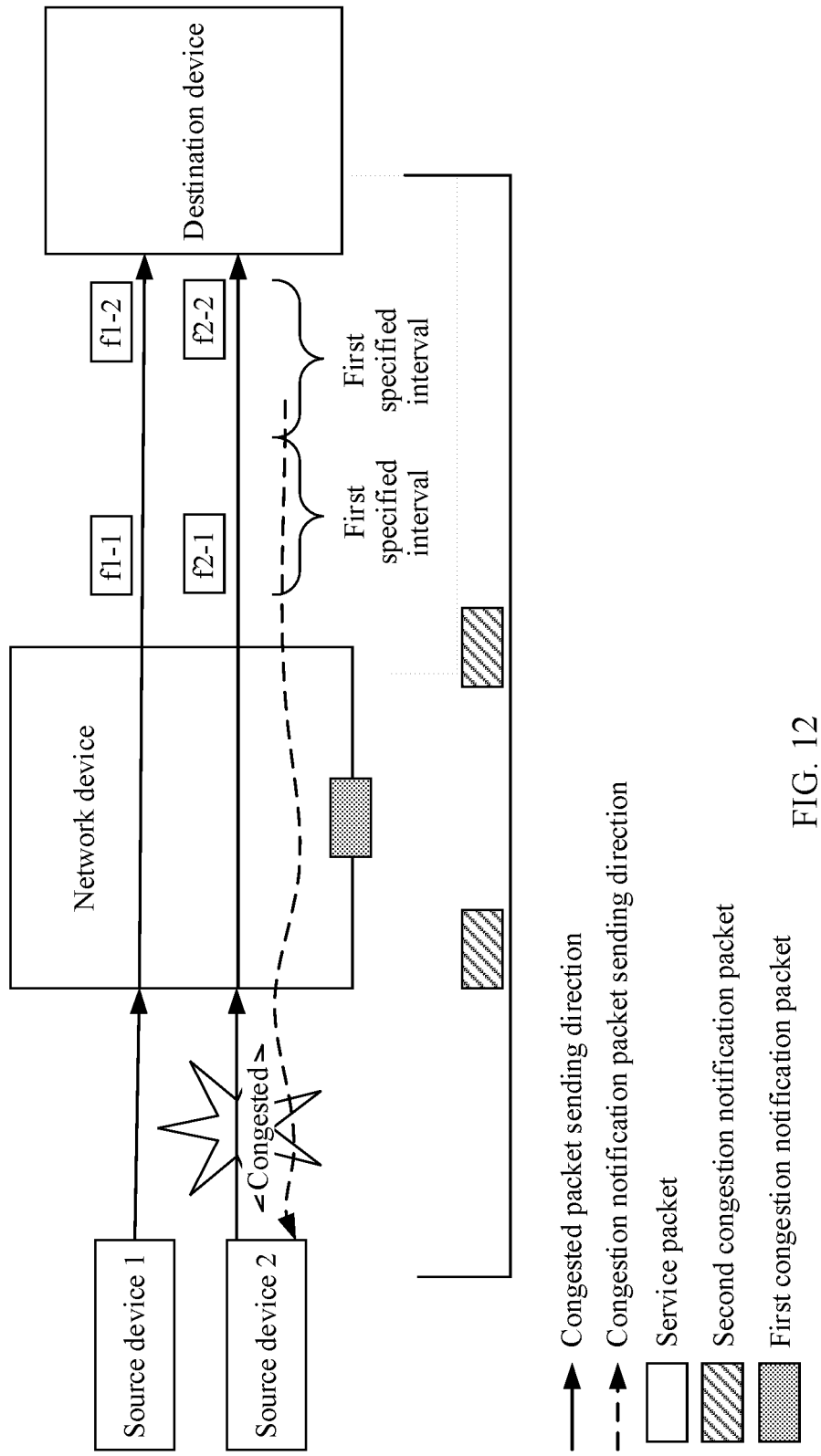
FIG. 12 is a schematic diagram of another stream congestion control.

The network device may also monitor whether the interval between the current time and the time of obtaining the first CNP packet is longer than or equal to the second specified interval. The second specified interval is determined based on the interval between the time of sending the first congestion packet and the time of receiving the second CNP packet sent by the destination device. If the interval between the current time and the time of sending the first congestion packet is longer than or equal to the second specified interval, the first CNP packet is sent. FIG. 12 is a schematic diagram of another stream congestion control. The coprocessor may estimate the time of sending the CE packet f2-1 to the destination device and the time of receiving the second CNP packet. After the CE packet f2-1 is sent and before the CE packet f2-2 is sent, the first CNP packet may be sent, to ensure that the first CNP packet is located between the second CNP packets of the two CE packets as much as possible.

It may be understood that the congestion identification and the congestion control of the queue, and the congestion identification and the congestion control of the stream may be performed in any sequence. The congestion identification and the congestion control may be performed only on the data stream, or only on the queue.

According to the congestion control method provided in this embodiment of this application, the time information of the congestion packet in the data stream is obtained. If the data stream is congested, a congestion notification may be sent for a packet that is congested beyond a specified interval. This can prevent a rate of the data stream from being increased when the data stream is congested, and improve packet transmission efficiency.

Figure 13:
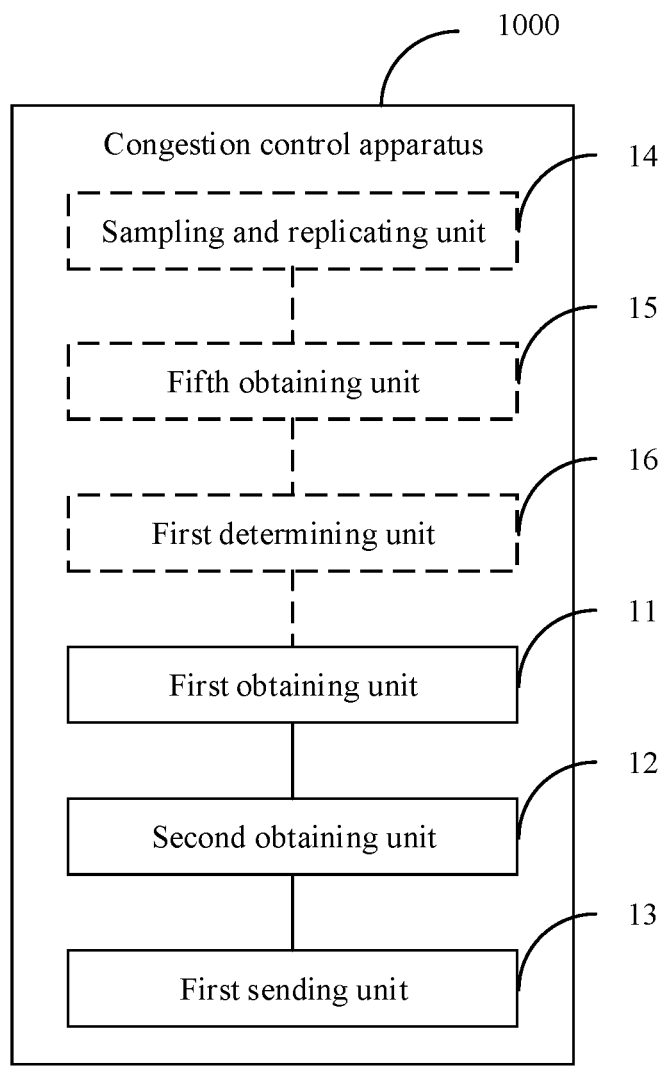
FIG. 13 is a schematic diagram of a structure of a congestion control apparatus according to an embodiment of this application.

Based on a same idea of the foregoing congestion control method, as shown in FIG. 13, an embodiment of this application further provides a congestion control apparatus 1000. The apparatus 1000 includes a first obtaining unit 11, a second obtaining unit 12, and a first sending unit 13, and may further include a sampling and replicating unit 14, a fifth obtaining unit 15, and a first determining unit 16 (represented by dashed lines in the figure).

The first obtaining unit 11 is configured to obtain time information of one or more congestion packets in a sent first data stream, where the one or more congestion packet carries a congestion flag. The second obtaining unit 12 is configured to: if the first data stream is congested, obtain, based on the time information of the one or more congestion packets in the first data stream, a first congestion notification packet, where the first congestion notification packet notifies that a packet is congested beyond a first specified interval. The first sending unit 13 is configured to send the first congestion notification packet.

In an embodiment, the second obtaining unit 12 is configured to: if an interval between current time and time of sending a first congestion packet is longer than or equal to the first specified interval, obtain the first congestion notification packet, where the first congestion notification packet is the last packet in the first data stream sent before the current time.

In another embodiment, the second obtaining unit 12 includes: a starting unit, configured to start a timer after the first congestion packet is sent, where timing duration of the timer is the first specified interval; and a third obtaining unit, configured to: when the timing duration arrives, if a next packet in the first data stream is not sent, obtain the first congestion notification packet.

In another embodiment, the second obtaining unit 12 includes: a first monitoring unit, configured to monitor, based on a specified period, whether the interval between the current time and the time of sending the first congestion packet is longer than or equal to the first specified interval; and a fourth obtaining unit, configured to: if the interval between the current time and the time of sending the first congestion packet is longer than or equal to the first specified interval, obtain the first congestion notification packet.

In another embodiment, the second obtaining unit 12 is configured to: if an interval between time of sending a second congestion packet and the time of sending the first congestion packet is longer than or equal to the first specified interval, obtain the first congestion notification packet, where the first congestion packet is a previous packet of the second congestion packet, and the first congestion packet and the second congestion packet correspond to the first data stream.

In another embodiment, the first sending unit 13 includes: a second monitoring unit, configured to monitor whether an interval between the current time and time of obtaining the first congestion packet is longer than or equal to a second specified interval; and a second sending unit, configured to: if the interval between the current time and the time of obtaining the first congestion packet is longer than or equal to the second specified interval, send the first congestion notification packet. The second specified interval may be determined based on the interval between the time of sending the first congestion packet and the time of receiving the second congestion notification packet sent by the destination device.

In another embodiment, the first sending unit 13 is configured to immediately send the first congestion notification packet after obtaining the first congestion notification packet.

In another embodiment, the apparatus further includes: the fifth obtaining unit 15, configured to obtain a transmission parameter of the one or more congestion packets in the first data stream; and the first determining unit 16, configured to determine, based on the transmission parameter of the one or more congestion packets, that the first data stream is congested.

In another embodiment, the apparatus further includes: the sampling and replicating unit 14, configured to sample and replicate, at a specified sampling rate, the one or more congestion packets in the first data stream, and obtain a mirrored data stream corresponding to the first data stream, where the mirrored data stream includes one or more mirrored packets.

In another embodiment, the transmission parameter includes a quantity of packets and a packet length, and the first determining unit 16 includes: a second determining unit, configured to determine, based on a quantity of congestion packets in one or more first data streams in a first queue sent in a first time period and a congestion packet length, a congestion packet rate of the queue; and a third determining unit, configured to: if the congestion packet rate of the queue is higher than or equal to a first rate threshold, determine that the first queue is congested and the first queue is in a congestion state.

In another embodiment, the apparatus further includes: a fourth determining unit, configured to: if the congestion packet rate of the queue is lower than or equal to a second rate threshold, determine that the first queue is not congested and the first queue exits the congestion state, where the second rate threshold is less than the first rate threshold.

In another embodiment, the transmission parameter includes a sequence number or sequence numbers of the one or more congestion packets in the first data stream, and the first determining unit 16 includes: a sixth obtaining unit, configured to obtain continuity of the sequence numbers of the congestion packets in the first data stream; and a fifth determining unit, configured to: if the continuity is greater than or equal to a first threshold, determine that the first queue is congested and the first data stream is in the congestion state.

In another embodiment, the apparatus further includes: a sixth determining unit, configured to: if the continuity is less than or equal to a second threshold, determine that the first data stream is not congested and the first data stream exits the congestion state, where the second threshold is less than the first threshold.

For specific embodiments of the foregoing units, refer to related descriptions of the congestion control methods shown in FIG. 4, FIG. 5A, FIG. 5B, and FIG. 5C.

According to the congestion control apparatus provided in this embodiment of this application, the time information of the congestion packet in the data stream is obtained. If the data stream is congested, a congestion notification may be sent for a packet that is congested beyond a specified interval. This can prevent a rate of the data stream from being increased when the data stream is congested, and improve packet transmission efficiency.

Figure 14:
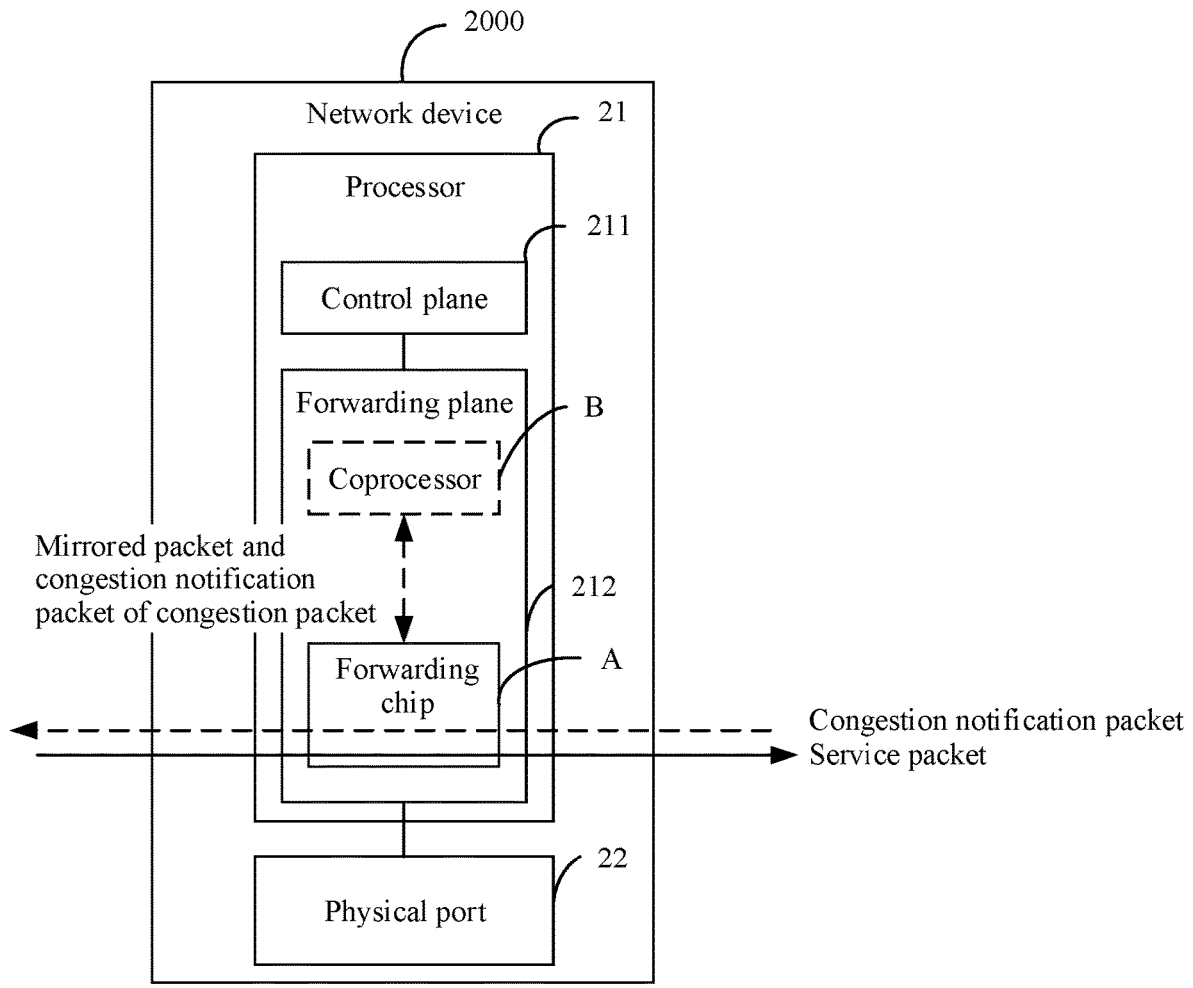
FIG. 14 is a schematic diagram of a structure of another congestion control apparatus according to an embodiment of this application.

Refer to FIG. 14. An embodiment of this application further provides another congestion control apparatus. The congestion control apparatus 2000 includes a processor 21 and a physical interface 22.

There may be one or more processors 21. The processor 21 includes a central processing unit, a network processor, a graphics processing unit (GPU), an application specific integrated circuit, a programmable logic device (PLD), or any combination thereof. The PLD may be a complex programmable logic device, a field programmable gate array, generic array logic, or any combination thereof. The processor 21 may include a control plane 211 and a forwarding plane 212. Specifically, the forwarding plane 212 may include a forwarding chip A. The forwarding chip A receives a service packet from a source device, and forwards the service packet to a destination device. In addition, in an embodiment, the forwarding chip A is further configured to implement the congestion control in embodiments of this application. Timeliness of implementing the congestion control through the forwarding plane is high. The forwarding plane 212 may further include a coprocessor B. In another embodiment, the coprocessor B replicates a CE packet from the forwarding chip A, that is, obtains a mirrored packet of the CE packet, and performs the congestion control in embodiments of this application.

The control plane 211 and the forwarding plane 212 may be implemented by independent circuits, or by an integrated circuit. For example, the processor 21 is a multi-core CPU. One or more of multiple cores implement the control plane 211, and the other cores implement the forwarding plane 212. For another example, the control plane 211 is implemented by a CPU, and the forwarding plane 212 is implemented by a network processor (NP), an application specific integrated circuit (ASIC), a field programmable gate array (FPGA), or any combination thereof. For another example, the congestion control apparatus is a frame-shaped network device. The control plane 211 is implemented by a main control card, and the forwarding plane 212 is implemented by a line card. For another example, both the control plane 211 and the forwarding plane 212 are implemented by an NP having capability of a control plane.

The physical interface 22 is configured to receive and send the service packet and send a CNP packet. Specifically, the physical interface 22 is configured to receive the service packet from the source device, forward the service packet to the destination device, receive the CNP packet from the destination device or obtain the CNP packet from the physical interface, and send the CNP packet to the source device.

There may be one or more physical interfaces 22. The physical interface 22 may include a wireless interface and/or a wired interface. For example, the wireless interface may include a wireless local area network (WLAN) interface, a Bluetooth interface, a cellular network interface, or any combination thereof. The wired interface may include an Ethernet interface, an asynchronous transfer mode interface, a fiber channel interface, or any combination thereof. The Ethernet interface may be an electrical interface or an optical interface. The physical interface 22 does not necessarily include (although usually includes) an Ethernet interface.

According to the congestion control apparatus provided in this embodiment of this application, the time information of the congestion packet in the data stream is obtained. If the data stream is congested, a congestion notification may be sent for a packet that is congested beyond a specified interval. This can prevent a rate of the data stream from being increased when the data stream is congested, and improve packet transmission efficiency.

This application further provides a computer-readable storage medium. The computer-readable storage medium stores a computer program; and when the computer program is executed by a computer, the computer is enabled to perform operations and/or processing performed by the network device in the foregoing method embodiment.

This application further provides a computer program product. The computer program product includes computer program code. When the computer program code is run on a computer, the computer is enabled to perform operations and/or processing performed by the network device in the foregoing method embodiment.

A person skilled in the art may clearly understand that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, the apparatus, and the method may be implemented in other manners. For example, division into units is merely logical function division and may be other division in actual embodiment. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

All or some of foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted by using a computer-readable storage medium. The computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid state disk (SSD).

What is claimed is:

1. A congestion control method, wherein the method comprises:
    obtaining a transmission parameter of one or more congestion packets in a first data stream, the transmission parameter comprises a quantity of packets and a packet length;
    determining, based on the transmission parameter of the one or more congestion packets, that the first data stream is congested comprising:
        determining, based on a quantity congestion packets in one or more first data streams in a first queue sent in a first time period and a congestion packet length, a congestion packet rate of the first queue, and
        when the congestion packet rate of the first queue is higher than or equal to a first rate threshold, determining that the first queue is congested and the first queue is in a congestion state;
    obtaining time information of one or more congestion packets in the sent first data stream, wherein each congestion packet carries a congestion flag;
    when the first data stream is determined to be congested, obtaining, based on the time information of the one or more congestion packets in the first data stream, a first congestion notification packet that notifies that a packet is congested beyond a first specified interval; and
    sending the first congestion notification packet.

2. The method according to claim 1, wherein when the first data stream is congested, the obtaining, based on the time information of the one or more congestion packets in the first data stream, the first congestion notification packet comprises:
    when an interval between a current time and a time of sending a first congestion packet is longer than or equal to the first specified interval, obtaining the first congestion notification packet, wherein the first congestion packet is a last packet in the first data stream sent before the current time.

3. The method according to claim 2, wherein when the interval between the current time and the time of sending the first congestion packet is longer than or equal to the first specified interval, the obtaining the first congestion notification packet comprises:

starting a timer after the first congestion packet is sent, wherein timing duration of the timer is the first specified interval; and when the timing duration arrives, if a next packet in the first data stream is not sent, obtaining the first congestion notification packet.

4. The method according to claim 2, wherein when the interval between the current time and the time of sending the first congestion packet is longer than or equal to the first specified interval, the obtaining the first congestion notification packet comprises:

monitoring, based on a specified period, whether the interval between the current time and the time of sending the first congestion packet is longer than or equal to the first specified interval; and when the interval between the current time and the time of sending the first congestion packet is longer than or equal to the first specified interval, obtaining the first congestion notification packet.

5. The method according to claim 1, wherein when the first data stream is congested, the obtaining, based on the time information of the one or more congestion packets in the first data stream, the first congestion notification packet comprises:

when an interval between a time of sending a second congestion packet and the time of sending the first congestion packet is longer than or equal to the first specified interval, obtaining the first congestion notification packet, wherein the first congestion packet is a previous packet of the second congestion packet, and the first congestion packet and the second congestion packet correspond to the first data stream.

6. The method according to claim 1, wherein the sending the first congestion notification packet comprises:

monitoring whether an interval between a current time and a time of obtaining the first congestion notification packet is longer than or equal to a second specified interval; and when the interval between the current time and the time of obtaining the first congestion packet is longer than or equal to the second specified interval, sending the first congestion notification packet.

7. The method according to claim 1, wherein the sending the first congestion notification packet comprises:

immediately sending the first congestion notification packet after obtaining the first congestion notification packet.

8. The method according to claim 1, wherein the method further comprises:

sampling and replicating, at a specified sampling rate, the one or more congestion packets in the first data stream, and obtaining a mirrored data stream corresponding to the first data stream, wherein the mirrored data stream comprises one or more mirrored packets.

9. The method according to claim 1, wherein the method further comprises:

when the congestion packet rate of the first queue is lower than or equal to a second rate threshold, determining that the first queue is not congested and the first queue exits the congestion state, wherein the second rate threshold is less than the first rate threshold.

10. The method according to claim 1, wherein the transmission parameter comprises a sequence number or sequence numbers of the one or more congestion packets in the first data stream, and the determining, based on the transmission parameter of the one or more congestion packets, that the first data stream is congested comprises:

obtaining continuity of the sequence numbers of the congestion packets in the first data stream; and when the continuity is greater than or equal to a first threshold, determining that the first queue is congested and the first data stream is in the congestion state.

11. The method according to claim 10, wherein the method further comprises:

when the continuity is less than or equal to a second threshold, determining that the first data stream is not congested and the first data stream exits the congestion state, wherein the second threshold is less than the first threshold.

12. A congestion control apparatus, comprising:

one or more processors; and a non-transitory computer-readable memory storing a program to be executed by the one or more processors, the program including instructions that, when executed by the one or more processors, cause the apparatus to:

obtain a transmission parameter of one or more congestion packets in a first data stream, the transmission parameter comprises a quantity of packets and a packet length, determine, based on the transmission parameter of the one or more congestion packets, that the first data stream is congested, including:

determining, based on a quantity congestion packets in one or more first data streams in a first queue sent in a first time period and a congestion packet length, a congestion packet rate of the first queue, and when the congestion packet rate of the first queue is higher than or equal to a first rate threshold, determining that the first queue is congested and the first queue is in a congestion state, obtain time information of one or more congestion packets in the sent first data stream, wherein each congestion packet carries a congestion flag, when the first data stream is determined to be congested, obtain, based on the time information of the one or more congestion packets in the first data stream, a first congestion notification packet that notifies that a packet is congested beyond a first specified interval, and send the first congestion notification packet.

13. The apparatus according to claim 12, wherein the program further comprises instructions that cause the apparatus to: when an interval between a current time and a time of sending a first congestion packet is longer than or equal to the first specified interval, obtain the first congestion notification packet, wherein the first congestion notification packet is a last packet in the first data stream sent before the current time.

14. The apparatus according to claim 13, wherein the program further comprises instructions that cause the apparatus to:

start a timer after the first congestion packet is sent, wherein timing duration of the timer is the first specified interval; and when the timing duration arrives, if a next packet in the first data stream is not sent, obtain the first congestion notification packet.

15. The apparatus according to claim 12, wherein the program further comprises instructions that cause the apparatus to:

monitor, based on a specified period, whether the interval between the current time and the time of sending the first congestion packet is longer than or equal to the first specified interval; and when the interval between the current time and the time of sending the first congestion packet is longer than or equal to the first specified interval, obtain the first congestion notification packet.

16. The apparatus according to claim 12, wherein the program further comprises instructions that cause the apparatus to: when an interval between a time of sending a second congestion packet and the time of sending the first congestion packet is longer than or equal to the first specified interval, obtain the first congestion notification packet, wherein the first congestion packet is a previous packet of the second congestion packet, and the first congestion packet and the second congestion packet correspond to the first data stream.

17. The apparatus according to claim 12, wherein the program further comprises instructions that cause the apparatus to:

monitor whether an interval between a current time and a time of obtaining the first congestion notification packet is longer than or equal to a second specified interval; and when the interval between the current time and the time of obtaining the first congestion packet is longer than or equal to the second specified interval, send the first congestion notification packet.

18. The apparatus according to claim 12, wherein the program further comprises instructions that cause the apparatus to immediately send the first congestion notification packet after obtaining the first congestion notification packet.

* * * * *